(12) United States Patent
Inoue et al.

(10) Patent No.: US 11,099,830 B2
(45) Date of Patent: Aug. 24, 2021

(54) SOFTWARE UPDATING APPARATUS, VEHICLE, AND SOFTWARE UPDATING METHOD

(71) Applicant: HONDA MOTOR CO., LTD., Tokyo (JP)

(72) Inventors: Genta Inoue, Wako (JP); Yosuke Shionoya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/796,498

(22) Filed: Feb. 20, 2020

(65) Prior Publication Data
US 2020/0272450 A1 Aug. 27, 2020

(30) Foreign Application Priority Data
Feb. 22, 2019 (JP) .............................. JP2019-030042

(51) Int. Cl.
*H04L 29/08* (2006.01)
*B60K 7/00* (2006.01)
*G07C 5/00* (2006.01)
*G06F 8/65* (2018.01)
*G06F 9/445* (2018.01)
(Continued)

(52) U.S. Cl.
CPC ................ *G06F 8/65* (2013.01); *B60L 53/66* (2019.02); *G06F 8/61* (2013.01); *G06F 8/71* (2013.01)

(58) Field of Classification Search
CPC ..... G06F 8/61; G06F 8/65; G06F 8/60; G06F 11/1433; G06F 8/71; Y02T 10/70; Y02T 10/7072; Y02T 90/14; Y02T 90/12; H04L 67/34; H04L 67/125; H04L 67/12; G05B 23/0283; G06N 20/00
See application file for complete search history.

(56) References Cited

U.S. PATENT DOCUMENTS

| 9,152,408 B2 | 10/2015 | Murata et al. | |
| 2013/0029595 A1* | 1/2013 | Widmer | H04B 5/0031 455/39 |

(Continued)

FOREIGN PATENT DOCUMENTS

| JP | 2017-091365 A | 5/2017 |
| JP | 6147791 B2 | 6/2017 |

(Continued)

OTHER PUBLICATIONS

Steger et al., SecUp: Secure and Efficient Wireless Software Updates for Vehicles, 9 pages (Year: 2016).*

(Continued)

*Primary Examiner* — Thuy Dao
(74) *Attorney, Agent, or Firm* — Carrier Blackman & Associates, P.C.; Joseph P. Carrier; Jeffrey T. Gedeon

(57) ABSTRACT

A software updating apparatus includes an update control section that performs a software update for each of a plurality of electronic control units mounted in a vehicle, by using new versions of software supplied via a network, and an update mode determining section that selectively determines an update mode used when performing the software update, from among a parallel update mode and a serial update mode. The update control section performs the software update for each of the plurality of electronic control units based on the update mode determined by the update mode determining section.

19 Claims, 16 Drawing Sheets

(51) Int. Cl.
*G06F 21/57* (2013.01)
*B60L 53/66* (2019.01)
*G06F 8/61* (2018.01)
*G06F 8/71* (2018.01)

(56) References Cited

U.S. PATENT DOCUMENTS

| | | | | |
|---|---|---|---|---|
| 2014/0191568 A1* | 7/2014 | Partovi | ................... | H02J 50/12 |
| | | | | 307/9.1 |
| 2014/0312848 A1* | 10/2014 | Alexander | ................ | H02J 3/14 |
| | | | | 320/134 |
| 2015/0116128 A1* | 4/2015 | Hald | ........................ | H04Q 9/00 |
| | | | | 340/870.02 |
| 2015/0169311 A1* | 6/2015 | Dickerson | ................. | G06F 8/65 |
| | | | | 717/170 |
| 2017/0115978 A1* | 4/2017 | Modi | ......................... | G06F 8/65 |
| 2017/0134164 A1 | 5/2017 | Haga et al. | | |
| 2017/0371640 A1* | 12/2017 | Choi | ........................ | B60R 16/02 |
| 2018/0018160 A1 | 1/2018 | Teraoka et al. | | |
| 2018/0032324 A1* | 2/2018 | Sarkar | ........................ | G06F 8/61 |
| 2018/0074811 A1 | 3/2018 | Kiyama et al. | | |
| 2018/0203683 A1* | 7/2018 | Kim | ...................... | G06F 1/3212 |
| 2018/0217831 A1* | 8/2018 | Madrid | ................... | H04L 63/08 |
| 2018/0293816 A1* | 10/2018 | Garrett | ................ | B60R 16/0234 |
| 2018/0339712 A1* | 11/2018 | Kislovskiy | ........ | B60W 50/0205 |
| 2019/0050217 A1* | 2/2019 | Tatourian | ............... | H04W 12/10 |
| 2019/0087169 A1 | 3/2019 | Arai | | |
| 2020/0089487 A1* | 3/2020 | Ramie | ........................ | G06F 8/65 |
| 2020/0125355 A1* | 4/2020 | Aust | ..................... | H04W 12/08 |
| 2020/0174782 A1* | 6/2020 | Buecherl | ................. | H04W 4/40 |
| 2020/0183674 A1 | 6/2020 | Tateishi et al. | | |

FOREIGN PATENT DOCUMENTS

| | | |
|---|---|---|
| JP | 6147792 B2 | 6/2017 |
| JP | 2017-157007 A | 9/2017 |
| JP | 6216730 B2 | 10/2017 |
| JP | 2018-020718 A | 2/2018 |
| JP | 2018-045515 A | 3/2018 |
| JP | 2018-133721 A | 8/2018 |
| WO | 2011/161778 A1 | 12/2011 |
| WO | 2016/075865 A1 | 5/2016 |

OTHER PUBLICATIONS

Office Action dated Oct. 27, 2020 issued over the corresponding Japanese Patent Application No. 2019-030042 with the English translation thereof.

\* cited by examiner

SOFTWARE UPDATING APPARATUS, VEHICLE, AND SOFTWARE UPDATING METHOD

CROSS-REFERENCE TO RELATED APPLICATION

This application is based upon and claims the benefit of priority from Japanese Patent Application No. 2019-030042 filed on Feb. 22, 2019, the contents of which are incorporated herein by reference.

BACKGROUND OF THE INVENTION

Field of the Invention

The present invention relates to a software updating apparatus, a vehicle, and a software updating method.

Description of the Related Art

Japanese Laid-Open Patent Publication No. 2018-045515 discloses technology for updating software of a control apparatus using update software distributed from a server.

SUMMARY OF THE INVENTION

However, there is a desire for technology to more favorably perform the update of software.

It is an object of the present invention to provide a software updating apparatus, a vehicle, and a software updating method that can more favorably perform the update of software.

A software updating apparatus according to one aspect of the present invention comprises an acquiring section configured to acquire a new version of software supplied via a network; an update control section configured to perform a software update for each of a plurality of electronic control units mounted in a vehicle, by using the new version of software acquired by the acquiring section; and an update mode determining section configured to selectively determine an update mode used when performing the software update for each of the plurality of electronic control units, from among a serial update mode in which the software update is performed in parallel for the plurality of electronic control units and a serial update mode in which the software update is performed in series for the plurality of electronic control units, wherein the update control section performs the software update for each of the plurality of electronic control units based on the update mode determined by the update mode determining section.

A software updating apparatus according to another aspect of the present invention comprises an acquiring section configured to acquire a new version of software supplied via a network; an update control section configured to perform a software update for each of a plurality of electronic control units mounted in a vehicle, by using the new version of software acquired by the acquiring section; an update mode determining section configured to selectively determine an update mode used when performing the software update for each of the plurality of electronic control units, from among a serial update mode in which the software update is performed in parallel for the plurality of electronic control units and a serial update mode in which the software update is performed in series for the plurality of electronic control units; and a scheduled activation timing judging section configured to judge a scheduled activation timing that is a timing at which the vehicle is scheduled to be activated, wherein the update control section determines the update mode of software for the plurality of electronic control units to be the serial update mode if a completion timing of the software update in a case where the software update is performed in the serial update mode for the plurality of electronic control units is before the scheduled activation timing judged by the scheduled activation timing judging section, and determines the update mode of software for the plurality of electronic control units to be the parallel update mode if the completion timing of the software update in the case where the software update is performed in the serial update mode for the plurality of electronic control units is after the scheduled activation timing judged by the scheduled activation timing judging section, and the update control section performs the software update for each of the plurality of electronic control units based on the update mode determined by the update mode determining section.

A vehicle according to yet another aspect of the present invention comprises a software updating apparatus described above.

A software updating method according to yet another aspect of the present invention, for performing a software update for each of a plurality of electronic control units mounted in a vehicle, by using a new version of software supplied via a network, comprises a step of selectively determining an update mode used when performing the software update for the plurality of electronic control units, from among a serial update mode in which the software update is performed in parallel for the plurality of electronic control units and a serial update mode in which the software update is performed in series for the plurality of electronic control units; and a step of performing the software update for the plurality electronic control units in the update mode determined in the step of determining the update mode.

According to the present invention, provided are a software updating apparatus, a vehicle, and a software updating method that can more favorably perform the update of software.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

The following describes in detail preferred embodiments of a software updating apparatus, a vehicle, and a software updating method according to the present invention, while referencing the accompanying drawings.

One Embodiment

Figure 1:
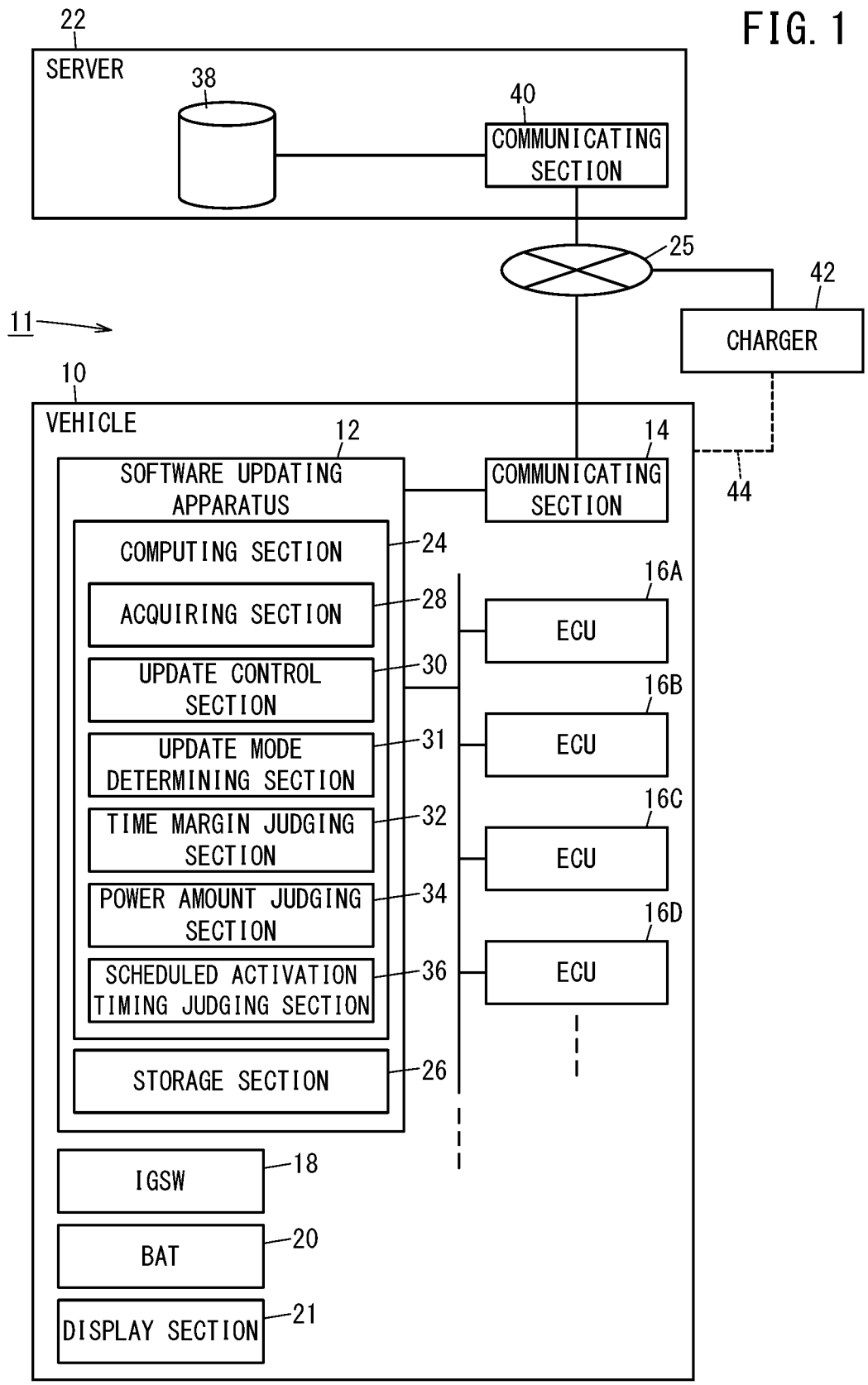
FIG. 1 is a block diagram showing a software updating system including a software updating apparatus according to an embodiment.

The following describes a software updating apparatus, a vehicle, and a software updating method according to one embodiment, using drawings. FIG. 1 is a block diagram showing a software updating system that includes the software updating apparatus according to the present embodiment.

A software updating system 11 according to the present embodiment includes a vehicle 10 and a server (external device) 22.

The vehicle 10 includes a software updating apparatus 12, a communicating section 14, electronic control units (ECU) 16, an ignition switch (IGSW) 18, a battery (BAT) 20, and a display section 21. When describing an electronic control unit in general, the reference numeral 16 is used, and when describing specific individual electronic control units, the reference numerals 16A, 16B, 16C, and 16D are used. The vehicle 10 includes a large number of electronic control units 16, but FIG. 1 shows four electronic control units 16 among the large number of electronic control units 16. In other words, FIG. 1 shows a first electronic control unit 16A, a second electronic control unit 16B, a third electronic control unit 16C, and a fourth electronic control unit 16D. Here, an example is described of a case in which the first electronic control unit 16A, the second electronic control unit 16B, the third electronic control unit 16C, and the fourth electronic control unit 16D operate cooperatively (operate in synchronization). The vehicle 10 also includes configurational elements other than the configurational elements described above, but these are omitted from this description.

The server 22 is provided with a database 38 and a communicating section 40. The communicating section 40 can perform wireless communication with the communicating section 14 included in the vehicle 10. A new version of software (update software) for updating the software installed in the electronic control units 16 (old version of software or current software) can be stored in the database 38. The server 22 also includes configurational elements other than the configurational elements described above, but these are omitted from this description.

The communicating section 14 can perform wireless communication with the communicating section 40 provided to the server 22, via a network 25. The network 25 may be the Internet, for example, but is not limited to this. The communicating section 14 may be a communicating section that can perform communication with a cellular system, or may be a communication section that can perform wireless LAN communication. The communicating section 14 can receive the new version of software supplied from the server 22 via the network 25.

A charger (external charger) 42 can be connected to the vehicle 10. The vehicle 10 and the charger 42 can be connected via a cable 44. The cable 44 includes a power source line (not shown in the drawing) and a communication line (not shown in the drawings). Therefore, when the vehicle 10 and the charger 42 are connected via the cable 44, the communicating section 14 can perform wired communication with the charger 42. The charger 42 can perform wired communication with the communicating section 40 provided to the server 22, via the network 25. Therefore, when the vehicle 10 and the charger 42 are connected via the cable 44, the communicating section 14 can perform wired communication with the communicating section 40 provided to the server 22, via the cable 44, the charger 42, and the network 25. If the new version of software cannot be acquired by wireless communication, the communicating section 14 can acquire the new version of software through wired communication using the cable 44 connected to the charger 42.

The software updating apparatus 12 includes a computing section 24 and a storage section 26. The computing section 24 performs control of the overall software updating apparatus 12. The computing section 24 is formed by a CPU (Central Processing Unit), for example. The computing section 24 performs update control of the software (firmware) by controlling each section based on a program stored in the storage section 26. The storage section 26 includes a volatile memory (not shown in the drawings) and a non-volatile memory (not shown in the drawings). The new version of software downloaded from the server 22 can be temporarily stored in the storage section 26.

The computing section 24 includes an acquiring section 28, an update control section 30, an update mode determining section 31, a time margin judging section 32, a power amount judging section 34, and a scheduled activation timing judging section 36. The acquiring section 28, the update control section 30, the update mode determining section 31, the time margin judging section 32, the power amount judging section 34, and the scheduled activation timing judging section 36 can be realized by the computing section 24 executing a program stored in the storage section 26.

The acquiring section 28 acquires the new version of software supplied from the server 22, via the network 25.

More specifically, the acquiring section 28 acquires the new version of software received by the communicating section 14.

The update control section 30 performs a software update, i.e. updates the software for each of the plurality of electronic control units 16 mounted in the vehicle 10, by using the new version of software acquired by the acquiring section 28.

Here, an example is described of a case in which a first old version of software (first current software) is installed in the first electronic control unit (electronic control unit) 16A. Furthermore, here, an example is described of a case in which a second old version of software (second current software) is installed in the second electronic control unit (electronic control unit) 16B. Yet further, here, an example is described of a case in which a third old version of software (third current software) is installed in the third electronic control unit (electronic control unit) 16C. Yet further, here, an example is described of a case in which a fourth old version of software (fourth current software) is installed in the fourth electronic control unit (electronic control unit) 16D. Yet further, here, an example is described of a case in which the first old version of software installed in the first electronic control unit 16A is updated to the first new version of software supplied from the server 22. Yet further, here, an example is described of a case in which the second old version of software installed in the second electronic control unit 16B is updated to a second new version of software supplied from the server 22. Yet further, here, an example is described of a case in which the third old version of software installed in the third electronic control unit 16C is updated to a third new version of software supplied from the server 22. Yet further, here, an example is described of a case in which the fourth old version of software installed in the fourth electronic control unit 16D is updated to a fourth new version of software supplied from the server 22.

Figure 2A:
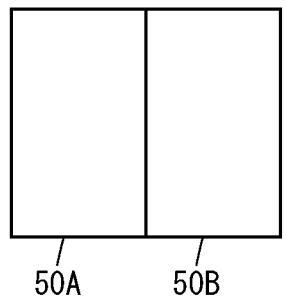
FIGS. 2A, 2B, 2C and 2D schematically show examples of configurations of nonvolatile memories.

The storage capacity of the nonvolatile memory (not shown in the drawings) included in the first electronic control unit 16A is relatively large. FIG. 2A schematically shows an example of a configuration of the nonvolatile memory included in the first electronic control unit 16A. The first electronic control unit 16A includes a plurality of nonvolatile memory chips. Here, an example is described of a case in which two nonvolatile memory chips are included, that is, a first memory chip and a second memory chip are included. The first memory chip is mounted on one surface of a substrate (not shown in the drawings), for example. The second memory chip is mounted on the other surface of the substrate, for example. The first memory chip forms a first bank (first memory bank, first storage location) 50A. The second memory chip forms a second bank (second memory bank, second storage location) 50B. Such a configuration is referred to as a double-bank configuration. In the first electronic control unit 16A, in a state where the first old version of software is installed in the first bank 50A, for example, it is possible to install the first new version of software in the second bank 50B. That is, the second bank 50B can function as a buffer when installing the first new version of software. In other words, the second bank 50B can function as a storage-capable region (installation-capable region) in which the first new version of software can be installed in the background. Here, an example is described in which the first electronic control unit 16A includes a plurality of memory chips, but the present invention is not limited to this. The first electronic control unit 16A may include one high-capacity memory chip. The first bank 50A and the second bank 50B may include one high-capacity memory chip.

The first electronic control unit 16A is an electronic control unit provided with a display control function, for example, but the present invention is not limited to this. More specifically, the first electronic control unit 16A is an ECU for in-vehicle infotainment (IVI), an ECU for a meter display portion, or the like, but the present invention is not limited to this.

Figure 2B:
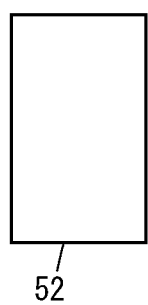

The capacity of the nonvolatile memory (not shown in the drawings) included in the second electronic control unit 16B is relatively small. FIG. 2B schematically shows an example of a configuration of the nonvolatile memory included in the second electronic control unit 16B. The second electronic control unit 16B includes just one nonvolatile memory chip, for example. A bank 52 is formed by the one memory chip. The second electronic control unit 16B includes only the one bank 52. Such a configuration is referred to as a single-bank configuration. In the second electronic control unit 16B, in a state where the second old version of software is installed in the memory chip, the second new version of software cannot be installed in this memory chip. In this way, the second electronic control unit 16B does not include a storage-capable region in which the second new version of software can be installed in the background.

Figure 2C:
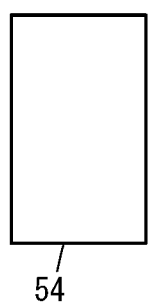

The capacity of the nonvolatile memory (not shown in the drawings) included in the third electronic control unit 16C is relatively small. FIG. 2C schematically shows an example of a configuration of the nonvolatile memory included in the third electronic control unit 16C. The third electronic control unit 16C includes just one nonvolatile memory chip, for example. A bank 54 is formed by the one memory chip. The third electronic control unit 16C includes only the one bank 54. In the third electronic control unit 16C, in a state where the third old version of software is installed in the memory chip, the third new version of software cannot be installed in this memory chip. In this way, the third electronic control unit 16C does not include a storage-capable region in which the third new version of software can be installed in the background.

Figure 2D:
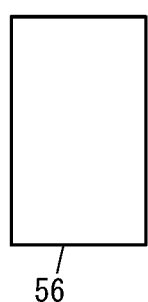

The capacity of the nonvolatile memory (not shown in the drawings) included in the fourth electronic control unit 16D is relatively small. FIG. 2D schematically shows an example of a configuration of the nonvolatile memory included in the fourth electronic control unit 16D. The fourth electronic control unit 16D includes just one nonvolatile memory chip, for example. A bank 56 is formed by the one memory chip. The fourth electronic control unit 16D includes only the one bank 56. In the fourth electronic control unit 16D, in a state where the fourth old version of software is installed in the memory chip, the fourth new version of software cannot be installed in this memory chip. In this way, the fourth electronic control unit 16D does not include a storage-capable region in which the fourth new version of software can be installed in the background.

As described above, the first electronic control unit 16A includes the second bank 50B, which is a storage-capable region in which the first new version of software can be installed in the background. Therefore, even while the vehicle 10 is travelling, the first new version of software can be installed in the first electronic control unit 16A.

As described above, the second electronic control unit 16B, the third electronic control unit 16C, and the fourth electronic control unit 16D do not include a storage-capable region in which the new versions of software can be installed in the background. Therefore, while the vehicle 10 is travelling, the new versions of software cannot be installed in the second electronic control unit 16B, the third electronic control unit 16C, and the fourth electronic control unit 16D. Accordingly, the update control section 30 installs the new versions of software in the second electronic control unit 16B, the third electronic control unit 16C, and the fourth electronic control unit 16D when the vehicle 10 is stopped. In other words, the update control section 30 installs the new versions of software in the electronic control units 16B to 16D when the main power supply of the vehicle 10 is OFF, i.e. when the ignition switch 18 is OFF. Even when the ignition switch 18 is OFF, the supply of power to the software updating apparatus 12, the communicating section 14, the electronic control units 16, and the like can be suitably performed from the battery 20 and the like. In a case where the vehicle 10 and the charger 42 are connected via the cable 44, the supply of power to the electronic control units 16 and the like can be performed from the charger 42.

As described above, the first new version of software can be installed in the first electronic control unit 16A even while the vehicle 10 is travelling. From the viewpoint of shortening the time during which the user cannot use the vehicle 10, it is preferable to configure the first electronic control unit 16A, in which the first new version of software can be installed while the vehicle 10 is travelling, in the manner described below. Specifically, the installation of the first new version of software in the first electronic control unit 16A is preferably performed while the vehicle 10 is travelling. The update control section 30 installs the first new version of software in the first electronic control unit 16A while the vehicle 10 is travelling, for example. As an example, in a case where the first old version of software is installed in the first bank 50A, it is possible to install the first new version of software in the second bank 50B. In this way, the update control section 30 updates the software in the first electronic control unit 16A such that the first old version of software and the first new version of software are both present in the first electronic control unit 16A. The activation of the first new version of software installed in the first electronic control unit 16A is not performed while the vehicle 10 is travelling. The installation of the first new version of software in the first electronic control unit 16A may be performed when the vehicle 10 is stopped. The activation refers to making it possible to perform a function included in the electronic control unit or the like when this electronic control unit is activated for the first time or after initialization of this electronic control unit.

The update mode determining section 31 selectively determines the update mode used when updating the software in each of the plurality of electronic control units 16, from among a parallel update mode and a serial update mode. The parallel update mode is an update mode for updating the software in parallel in the plurality of the electronic control units 16. The serial update mode is an update mode for updating the software in series in the plurality of the electronic control units 16. The update control section 30 updates the software in each of the plurality of electronic control units 16 based on the update mode determined by the update mode determining section 31.

The update control section 30 activates the first new version of software installed in the first electronic control unit 16A when the vehicle 10 is stopped. In other words, the update control section 30 activates the first new version of software installed in the first electronic control unit 16A when the main power source of the vehicle 10 is OFF, i.e. when the ignition switch 18 is OFF.

The update control section 30 can update the software in the first electronic control unit 16A in which the first new version of software is installed, such that the first electronic control unit 16A can operate in the manner described below. Specifically, the update control section 30 updates the software such that the first electronic control unit 16A can selectively execute operational logic (source code, program code, or program code logic) of the first new version of software and operational logic of the first old version of software.

As described above, the first old version of software is installed in the first bank 50A. In this state, the first new version of software is installed in the second bank 50B. Since the first new version of software is installed in the second bank 50B in a state where the first old version of software is installed in the first bank 50A, the first electronic control unit 16A can operate in the manner described below. Specifically, the first electronic control unit 16A can selectively execute the operational logic of the first old version of software, which is the software prior to the update, and the operational logic of the first new version of software, which is the updated software. The first new version of software may be capable of realizing not only the operational logic of the first new version of software, but also the operational logic of the first old version of software.

When the software update has been completed correctly for the electronic control units 16B to 16D, the update control section 30 causes the first electronic control unit 16A to start the execution of the operational logic of the first new version of software.

If the installation of the new version of software is not completed correctly for any one of the electronic control units 16B to 16D, the update control section 30 performs a rollback process. In other words, if the installation of the new version of software is not completed correctly for any one of the electronic control units 16B to 16D, the update control section 30 performs a process to return the software of these electronic control units 16B to 16D to the state prior to the update. In this case, the update control section 30 causes the first electronic control unit 16A to execute the operational logic of the first old version of software. In this case, it is acceptable for the update control section 30 to not activate the first new version of software installed in the first electronic control unit 16A.

If the activation of the new versions of software installed in the electronic control units 16B to 16D is not completed correctly, the update control section 30 performs the rollback process on the electronic control units 16B to 16D. In other words, if the activation of the new versions of software installed in the electronic control units 16B to 16D is not completed correctly, the update control section 30 performs the process to return the software in the electronic control units 16B to 16D to the state prior to the update. In this case, the update control section 30 causes the first electronic control unit 16A to execute the operational logic of the first old version of software. In this case, it is acceptable for the update control section 30 to not activate the first new version of software installed in the first electronic control unit 16A.

In this way, in the present embodiment, the software update is performed such that it is possible for the first electronic control unit 16A to selectively execute the operational logic of the first new version of software and the operational logic of the first old version of software. According to the present embodiment, if the first electronic control unit 16A in which the new version of software is installed and the electronic control units 16B to 16D in which the new version of software is installed cannot operate together in a favorable manner, it is possible to perform the operation described below. Specifically, in such a case, the update control section 30 returns the software of the electronic control units 16B to 16D to the state prior to the update and causes the first electronic control unit 16A to execute the operational logic of the first old version of software. By doing this, according to the present embodiment, the first electronic control unit 16A and the electronic control units 16B to 16D can be made to operate together, despite the first new version of software being installed in the first electronic control unit 16A.

The update mode determining section 31 can determine the update mode for updating the software in the plurality of electronic control units 16 to be the serial update mode, for example, when the vehicle 10 is connected to the charger 42 provided in a home.

The update mode determining section 31 can determine the update mode for updating the software in some electronic control units 16 among the plurality of electronic control units 16 to be the parallel update mode, for example. Furthermore, the update mode determining section 31 determines the update mode for updating the software in the other electronic control units 16 among the plurality of electronic control units 16 to be the serial update mode, for example. The update mode determining section 31 can determine the update mode for updating the software in the electronic control units 16A and 16B to be the parallel update mode, for example. Furthermore, the update mode determining section 31 can determine the update mode for updating the software in the electronic control units 16C and 16D to be the serial update mode, for example.

If the software update cannot be completed correctly in the parallel update mode, the update control section 30 can perform the software update in the serial update mode.

The update mode determining section 31 performs time distribution such that the software update for the plurality of electronic control units 16 is completed by a scheduled activation timing, which is a timing at which the vehicle 10 is scheduled to be activated. Specifically, the update mode determining section 31 performs time distribution between time spent updating the software in the parallel update mode and time spent updating the software in the serial update mode. Since the time distribution is suitably performed by the update mode determining section 31, the software update can be reliably completed by the scheduled activation timing. The timing at which the vehicle 10 is scheduled to be activated, i.e. the scheduled activation timing of the vehicle 10, can be judged by the scheduled activation timing judging section 36.

If the completion timing of the software update in a case where the software update for the plurality of electronic control units 16 is performed in the serial update mode is before the scheduled activation timing judged by the scheduled activation timing judging section 36, the update mode determining section 31 makes a determination such as described below. More specifically, if the completion timing of the software update in the case where the software update for the plurality of electronic control units 16 is performed in the serial update mode is before a timing that is a prescribed time earlier than the scheduled activation timing, the update mode determining section 31 makes a determination such as described below. Specifically, in such a case, the update mode determining section 31 determines the update mode of the software for the plurality of electronic control units 16 to be the sequential mode, for example. If the completion timing of the software update in the case where the software update for the plurality of electronic control units 16 is performed in the serial update mode is after the scheduled activation timing judged by the scheduled activation timing judging section 36, the update mode determining section 31 makes a determination such as described below. More specifically, if the completion timing of the software update in the case where the software update for the plurality of electronic control units 16 is performed in the serial update mode is after a timing that is a prescribed time earlier than the scheduled activation timing, the update mode determining section 31 makes a determination such as described below. In such a case, the update mode determining section 31 determines the software update mode for the plurality of electronic control units 16 to be the parallel update mode, for example.

The time margin judging section 32 can judge whether there is enough time to perform a retry process (retest process) for the installation of the new version of software. The time margin judging section 32 can judge whether there is enough time to perform the retry process based on the current timing, the time needed for the retry process, and the timing at which the vehicle 10 is scheduled to be activated. The timing at which the vehicle 10 is scheduled to be activated, i.e. the scheduled activation timing of the vehicle 10, can be judged by the scheduled activation timing judging section 36.

In a case where the installation of the new version of software in the electronic control units 16 has not been completed correctly and the time margin judging section 32 has judged that there is enough time, the update control section 30 performs a process such as described below. Specifically, in such a case, the update control section 30 performs the retry process for the installation of the new versions of software in the electronic control units 16.

The battery 20 includes a voltage sensor (not shown in the drawings), a temperature sensor (not shown in the drawings), and a current sensor (not shown in the drawings). The signals output from the respective sensors of the battery 20 are supplied to the software updating apparatus 12. The power amount judging section 34 judges the state of charge (SOC) of the battery 20, based on the signals supplied from the battery 20. The power amount judging section 34 judges whether the amount of power stored in the battery 20 is sufficient. More specifically, the power amount judging section 34 judges whether the amount of power stored in the battery 20 is enough to perform the software update. The power amount judging section 34 judges whether the amount of power stored in the battery 20 is sufficient based on the time needed for the software update, the power to be consumed during the software update, and the amount of power stored in the battery 20. The update control section 30 can start the software update when the power amount judging section 34 has judged that the amount of power stored in the battery 20 is sufficient.

When the activation of the first new version of software installed in the first electronic control unit 16A has been completed correctly, the update control section 30 performs a shutdown process on the first electronic control unit 16A. When the activation of the second new version of software installed in the second electronic control unit 16B has been completed correctly, the update control section 30 performs a shutdown process on the second electronic control unit 16B. When the activation of the third new version of software installed in the third electronic control unit 16C has been completed correctly, the update control section 30 performs a shutdown process on the third electronic control unit 16C. When the activation of the fourth new version of software installed in the fourth electronic control unit 16D has been completed correctly, the update control section 30 performs a shutdown process on the fourth electronic control unit 16D.

The scheduled activation timing judging section 36 stores the information described below in the storage section 26, every time the vehicle 10 stops, i.e. every time the main power source of the vehicle 10 is turned OFF. Specifically, the scheduled activation timing judging section 36 stores, in the storage section 26, the date on which the vehicle 10 is stopped, the day of the week on which the vehicle 10 is stopped, the timing at which the stopping of the vehicle 10 is started, the timing at which the stopped vehicle 10 is activated, the location where the vehicle 10 is stopped, for example. The scheduled activation timing judging section 36 judges the scheduled activation timing of the stopped vehicle 10, based on the above information. The scheduled activation timing judging section 36 judges the scheduled activation timing of the vehicle 10 that is currently stopped, based on the current position of the vehicle 10, the current timing, and the like, for example. The vehicle 10 includes a GNSS (Global Navigation Satellite System) sensor (not shown in the drawings), for example. The scheduled activation timing judging section 36 can detect the current position of the vehicle 10 based on the information supplied from the GNSS sensor. For example, when the current position of the vehicle 10 is the home and the current timing is 21:00, for example, the scheduled activation timing judging section 36 can judge that the vehicle 10 will be activated at 7:00 on the following day, for example. The scheduled activation timing judging section 36 may be realized using AI (Artificial Intelligence) technology.

When it is anticipated that the software update for the plurality of electronic control units 16 will be completed before the scheduled activation timing judged by the scheduled activation timing judging section 36, the update control section 30 starts the software update for the plurality of electronic control units 16. More specifically, when it is anticipated that the software update for the plurality of electronic control units 16 will be completed by a timing that is a prescribed time earlier than the scheduled activation timing, the update control section 30 starts the software update for the plurality of electronic control units 16. The software update for the electronic control units 16 includes the installation of the new versions of software in the electronic control units 16 and the activation of the new versions of software installed in the electronic control units 16.

A display screen relating to the software update and the like can be displayed in the display section 21. The display section 21 is a touch panel, for example, but is not limited to this. The user can perform manipulation input to the software updating apparatus 12 by manipulating the touch panel, for example. The user can indicate the intent to agree to the software update, for example, by manipulating the touch panel.

Figure 3:
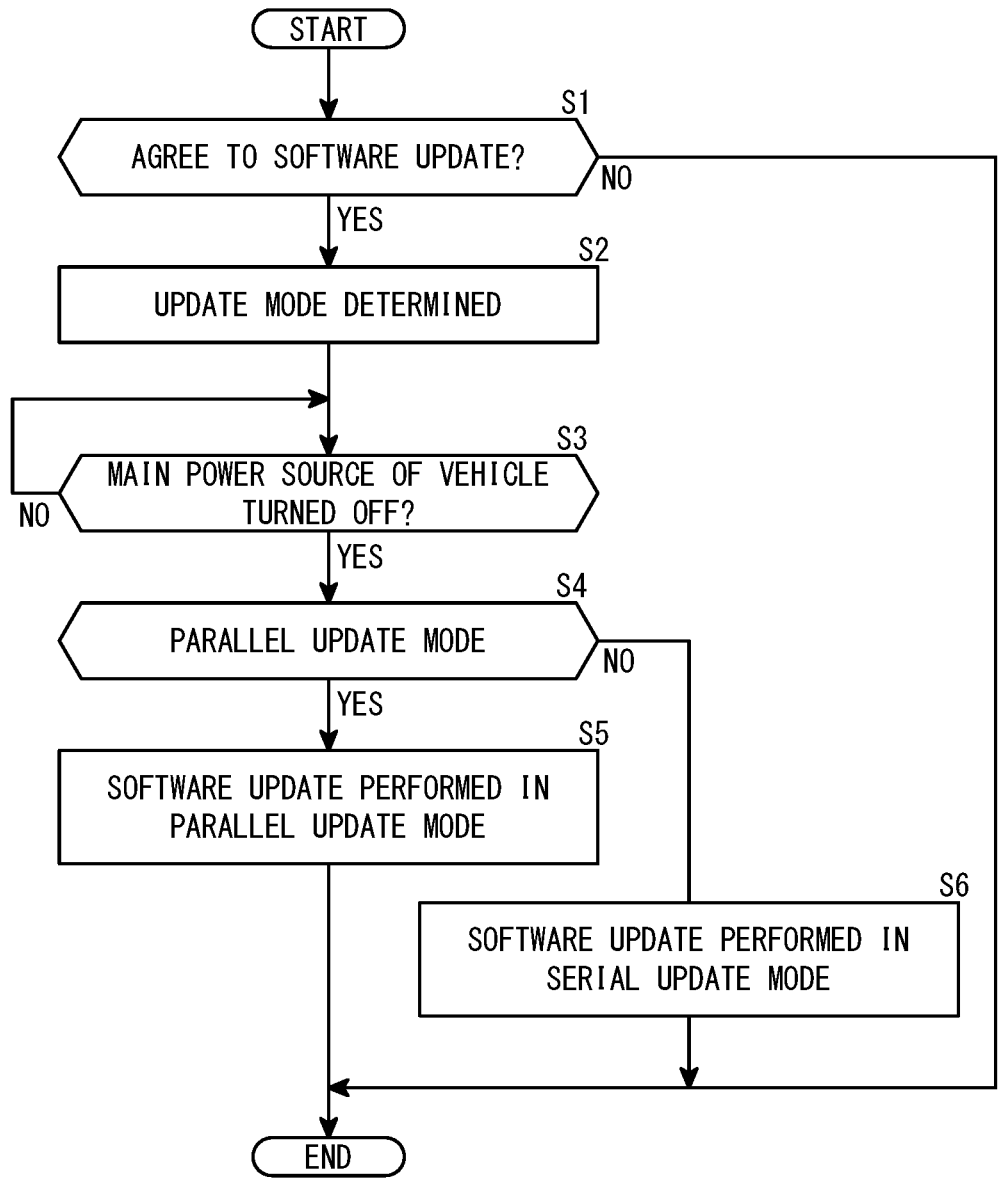
FIG. 3 is a flow chart showing an example of an operation of the software updating apparatus according to an embodiment.

FIG. 3 is a flow chart showing an example of an operation of the software updating apparatus according to the present embodiment.

At step S1, the update control section 30 displays, in the display section 21, a display screen asking the user whether he or she agrees to perform the software update. Step S1 is performed in a state where the main power source of the vehicle 10 is ON. The user can indicate the intent whether he or she agrees to the software update by manipulating the touch panel provided to the display section 21, for example. If the user agrees to the software update (YES at step S1), the process moves to step S2. If the user does not agree to the software update (NO at step S1), the process shown in FIG. 3 is completed.

At step S2, the update mode determining section 31 determines the update mode. After this, the process moves to step S3.

At step S3, the update control section 30 judges whether the main power source of the vehicle 10 has been turned OFF. In other words, the update control section 30 judges whether the ignition switch 18 has been turned OFF. If the main power source of the vehicle 10 has been turned OFF (YES at step S3), the process moves to step S4. If the main power source of the vehicle 10 is ON (NO at step S3), step S3 is repeated.

At step S4, the update control section 30 judges the update mode determined by the update mode determining section 31 at step S2. If the update mode determined by the update mode determining section 31 at step S2 is the parallel update mode (YES at step S4), the process moves to step S5. If the update mode determined by the update mode determining section 31 at step S2 is the serial update mode (NO at step S4), the process moves to step S6.

At step S5, the update control section 30 performs the software update for each of the plurality of electronic control units 16 in the parallel update mode. When step S5 is completed, the process shown in FIG. 3 is completed.

At step S6, the update control section 30 performs the software update for each of the plurality of electronic control units 16 in the serial update mode. When step S6 is completed, the process shown in FIG. 3 is completed.

Figure 4:
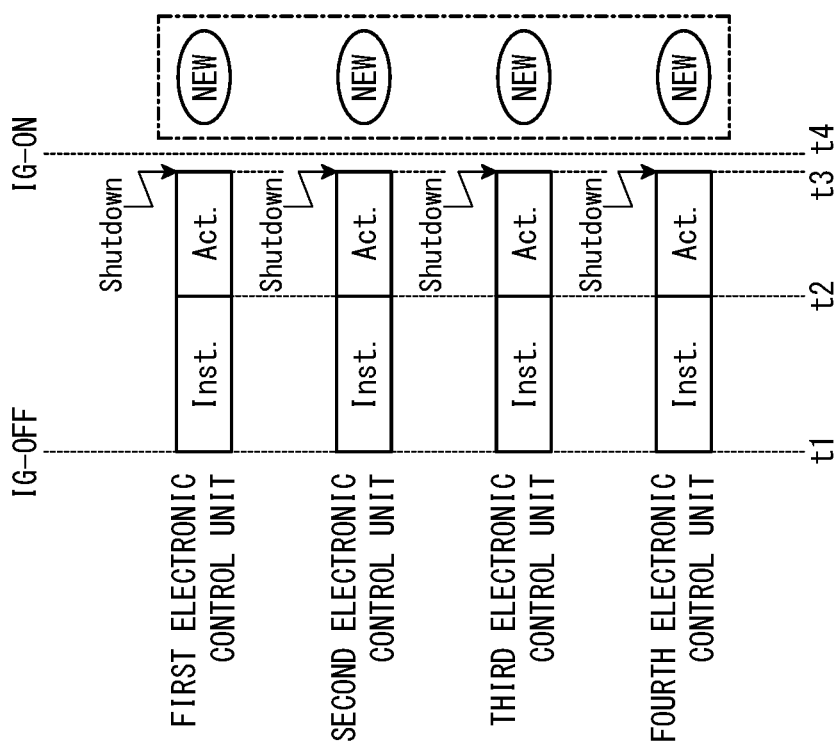
FIG. 4 is a timing chart showing an example of an operation of the software updating apparatus according to an embodiment.

FIG. 4 is a timing chart showing an example of an operation of the software updating apparatus according to the present embodiment. The timing chart shown in FIG. 4 corresponds to step S5 in FIG. 3. In other words, FIG. 4 shows an example of a case in which the software update for the plurality of electronic control units 16 is performed in the parallel update mode. Here, the software update for the four electronic control units 16A to 16D is shown, but the number of electronic control units 16 for which the software update is performed is not limited to four.

As shown in FIG. 4, at a timing t1, the ignition switch 18 is turned OFF. At the timing t1, the installation of the new versions of software in the plurality of electronic control units 16, i.e. the electronic control units 16A to 16D, is started.

At a timing t2, the installation of the new versions of software in the plurality of electronic control units 16 is completed. Here, in order to simplify the description, an example is described of a case in which the installations of the new versions of software in the electronic control units 16A to 16D are completed simultaneously, but the present invention is not limited to this. When the installation of the new versions of software in the plurality of electronic control units 16 is completed, the activation of the new version of software installed in each of the plurality of electronic control units 16 is started.

At a timing t3, the activation of the new version of software installed in each of the plurality of electronic control units 16 is completed. When the activation of the new version of software installed in each of the plurality of electronic control units 16 is completed correctly, the update control section 30 performs the shutdown process for each of the plurality of electronic control units 16. Here, in order to simplify the description, an example is described of a case in which the shutdown processes for the electronic control units 16 are performed simultaneously, but the present invention is not limited to this.

At a timing t4, the ignition switch 18 is turned ON. From the timing t4, each of the plurality of electronic control units 16 executes the operational logic of the new version of software (NEW). From the timing t4, the electronic control units 16A to 16D, which operate based on the new versions of software, operate cooperatively (operate in synchronization).

According to the example shown in FIG. 4, the software update for the plurality of electronic control units 16 is performed in the parallel update mode, and therefore it is possible to complete the software update in a relatively short time.

Figure 5:
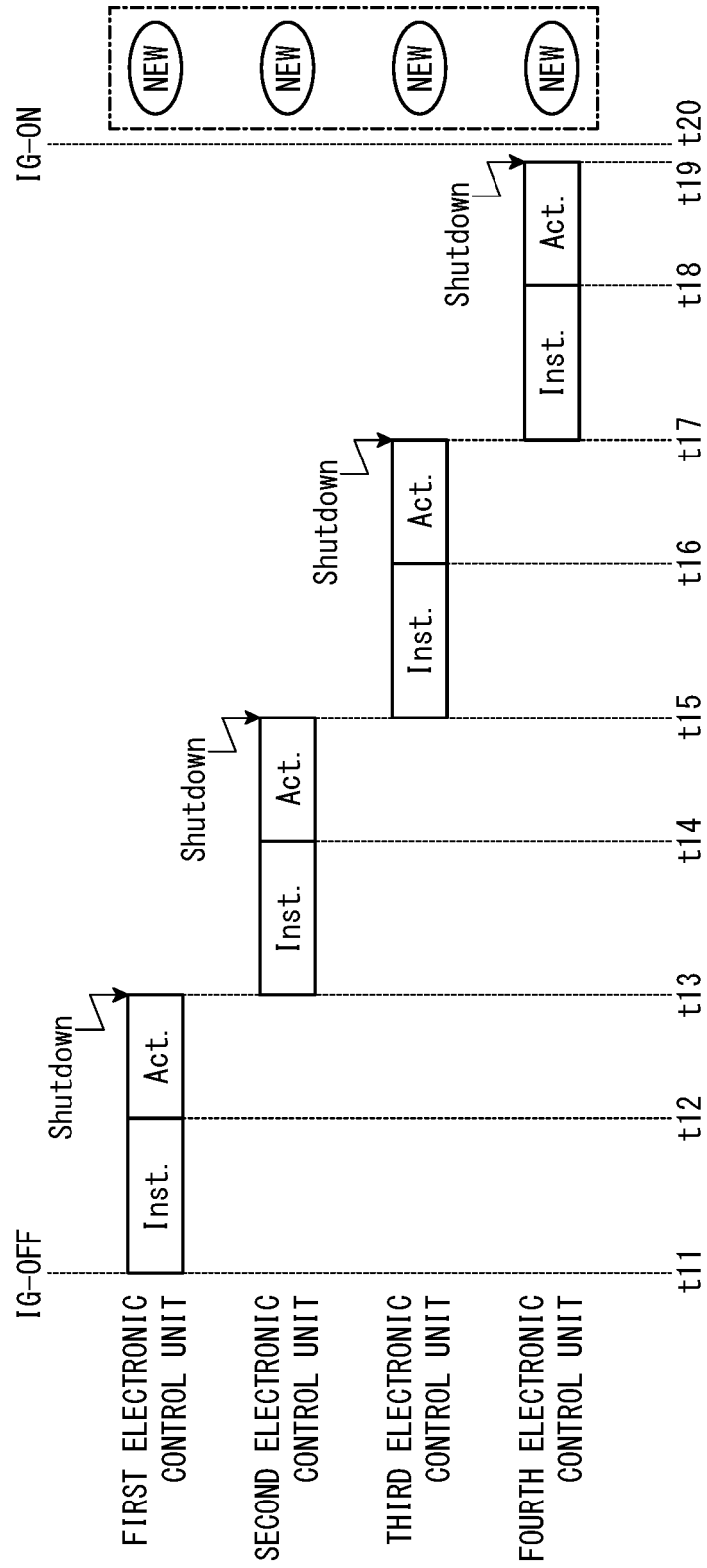
FIG. 5 is a timing chart showing an example of an operation of the software updating apparatus according to an embodiment.

FIG. 5 is a timing chart showing an example of an operation of the software updating apparatus according to the present embodiment. The timing chart shown in FIG. 5 corresponds to step S6 in FIG. 3. In other words, FIG. 5 shows an example of a case in which the software update for the plurality of electronic control units 16A to 16D is performed in the serial update mode. Here, the software update for the four electronic control units 16A to 16D is shown, but the number of electronic control units 16 for which the software update is performed is not limited to four.

As shown in FIG. 5, at a timing t11, the ignition switch 18 is turned OFF. At the timing t11, the installation of the first new version of software in the first electronic control unit 16A is started.

At a timing t12, the installation of the first new version of software in the first electronic control unit 16A is completed. When the installation of the first new version of software in the first electronic control unit 16A is completed, the activation of the first new version of software installed in the first electronic control unit 16A is started.

At a timing t13, the activation of the first new version of software installed in the first electronic control unit 16A is completed. When the activation of the first new version of software installed in the first electronic control unit 16A is completed correctly, the update control section 30 performs the shutdown process on the first electronic control unit 16A. When the activation of the first new version of software installed in the first electronic control unit 16A is completed, the installation of the second new version of software in the second electronic control unit 16B is started.

At a timing t14, the installation of the second new version of software in the second electronic control unit 16B is completed. When the installation of the second new version of software in the second electronic control unit 16B is completed, the activation of the second new version of software installed in the second electronic control unit 16B is started.

At a timing t15, the activation of the second new version of software installed in the second electronic control unit 16B is completed. When the activation of the second new version of software installed in the second electronic control unit 16B is completed correctly, the update control section 30 performs the shutdown process on the second electronic control unit 16B. When the activation of the second new version of software installed in the second electronic control unit 16B is completed, the installation of the third new version of software in the third electronic control unit 16C is started.

At a timing t16, the installation of the third new version of software in the third electronic control unit 16C is completed. When the installation of the third new version of software in the third electronic control unit 16C is completed, the activation of the third new version of software installed in the third electronic control unit 16C is started.

At a timing t17, the activation of the third new version of software installed in the third electronic control unit 16C is completed. When the activation of the third new version of software installed in the third electronic control unit 16C is completed correctly, the update control section 30 performs the shutdown process on the third electronic control unit 16C. When the activation of the third new version of software installed in the third electronic control unit 16C is completed, the installation of the fourth new version of software in the fourth electronic control unit 16D is started.

At a timing t18, the installation of the fourth new version of software in the fourth electronic control unit 16D is completed. When the installation of the fourth new version of software in the fourth electronic control unit 16D is completed, the activation of the fourth new version of software installed in the fourth electronic control unit 16D is started.

At a timing t19, the activation of the fourth new version of software installed in the fourth electronic control unit 16D is completed. When the activation of the fourth new version of software installed in the fourth electronic control unit 16D is completed correctly, the update control section 30 performs the shutdown process on the fourth electronic control unit 16D.

At a timing t20, the ignition switch 18 is turned ON. From the timing t20, each of the plurality of electronic control units 16 executes the operational logic of the new version of software (NEW). From the timing t20, the electronic control units 16A to 16D, which operate based on the new versions of software, operate cooperatively (operate in synchronization).

According to the example shown in FIG. 5, the software update for the plurality of electronic control units 16 is performed in the serial update mode. Even if it is impossible to update the software in the parallel update mode, there are cases where it is possible to update the software in the serial update mode. According to the example shown in FIG. 5, it is possible to more reliably perform the software update.

Figure 6:
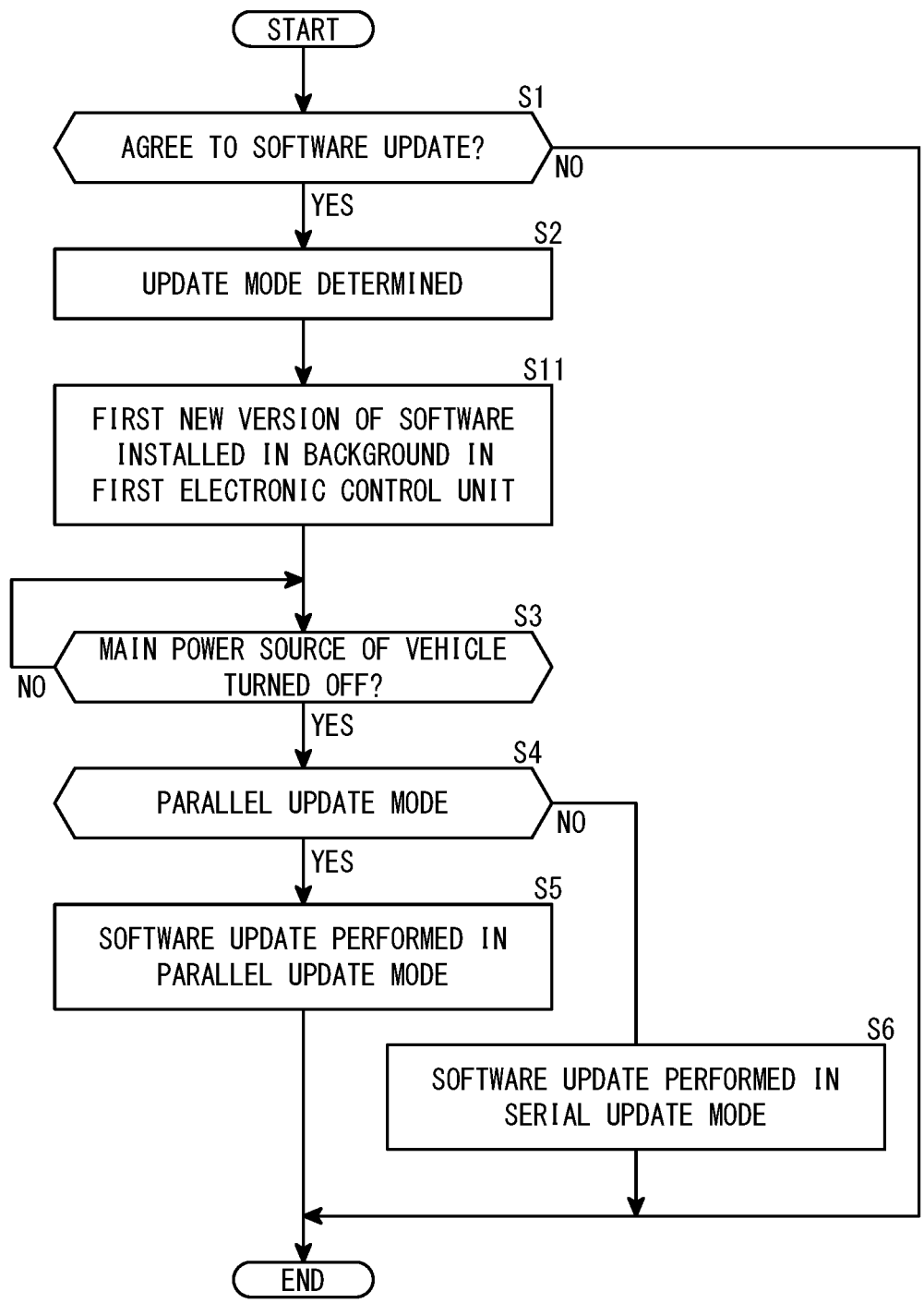
FIG. 6 is a flow chart showing an example of an operation of the software updating apparatus according to an embodiment.

FIG. 6 is a flow chart showing an example of an operation of the software updating apparatus according to the present embodiment. FIG. 6 shows an example of a case in which the installation of the first new version of software in the first electronic control unit 16A is performed in the background while the vehicle 10 is travelling.

At step S1, the update control section 30 displays, in the display section 21, a display screen asking the user whether he or she agrees to perform the software update. Step S1 is can be performed while the vehicle 10 is travelling, for example. If the user agrees to the software update (YES at step S1), the process moves to step S2. If the user does not agree to the software update (NO at step S1), the process shown in FIG. 6 is completed.

At step S2, the update mode determining section 31 determines the update mode. After this, the process moves to step S11.

At step S11, the update control section 30 installs the first new version of software in the first electronic control unit 16A in the background. In addition to the first electronic control unit 16A, if there are electronic control units 16 for which new versions of software can be installed in the background, the new versions of software are installed in the background in these electronic control units 16 as well. After this, the process moves to step S3.

Steps S3 to S6 are the same as steps S3 to S6 described above using FIG. 3, and therefore descriptions of these steps are omitted. In this way, the process shown in FIG. 6 is completed.

Figure 7:
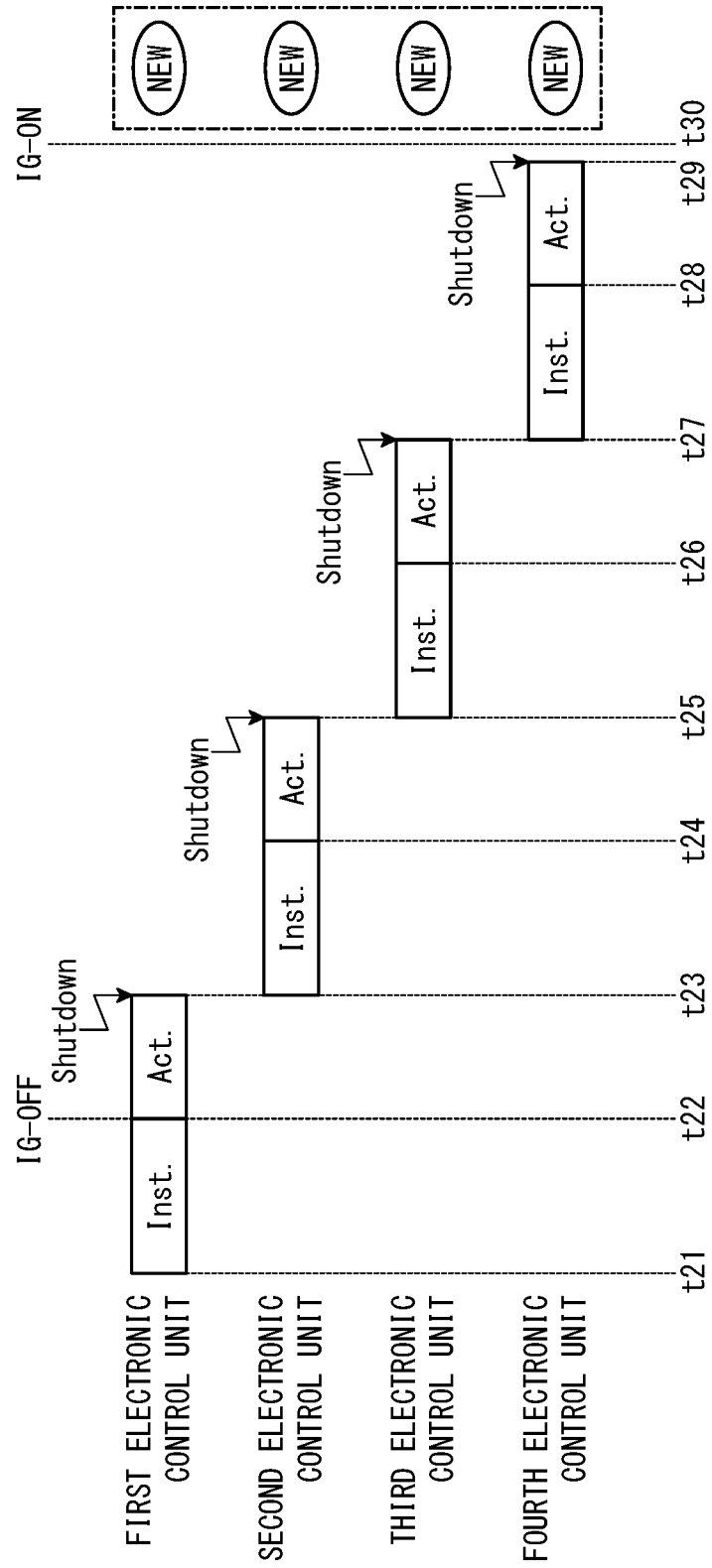
FIG. 7 is a timing chart showing an example of an operation of the software updating apparatus according to an embodiment.

FIG. 7 is a timing chart showing an example of an operation of the software updating apparatus according to the present embodiment. The timing chart shown in FIG. 7 corresponds to steps S11 and S6 in FIG. 6. In other words, FIG. 7 shows an example of a case in which the software update is performed in the serial update mode after the new version of software has been installed in the first electronic control unit 16A while the vehicle 10 was travelling and the ignition switch 18 has been turned OFF. Here, the software update for the four electronic control units 16A to 16D is shown, but the number of electronic control units 16 for which the software update is performed is not limited to four.

As shown in FIG. 7, at a timing t21, the installation of the first new version of software in the first electronic control unit 16A is started. At the timing t21, the ignition switch 18 is ON, and the vehicle 10 is travelling. In this way, the installation of the first new version of software in the first electronic control unit 16A is performed in a state where the ignition switch 18 is ON.

At a timing t22, the ignition switch 18 is turned OFF. When the ignition switch 18 is turned OFF, the activation of the first new version of software installed in the first electronic control unit 16A is started.

At a timing t23, the activation of the first new version of software installed in the first electronic control unit 16A is completed. When the activation of the first new version of software installed in the first electronic control unit 16A is completed correctly, the update control section 30 performs the shutdown process on the first electronic control unit 16A. When the activation of the first new version of software installed in the first electronic control unit 16A is completed, the installation of the second new version of software in the second electronic control unit 16B is started.

At a timing t24, the installation of the second new version of software in the second electronic control unit 16B is completed. When the installation of the second new version of software in the second electronic control unit 16B is completed, the activation of the second new version of software installed in the second electronic control unit 16B is started.

At a timing t25, the activation of the second new version of software installed in the second electronic control unit 16B is completed. When the activation of the second new version of software installed in the second electronic control unit 16B is completed correctly, the update control section 30 performs the shutdown process on the second electronic control unit 16B. When the activation of the second new version of software installed in the second electronic control unit 16B is completed, the installation of the third new version of software in the third electronic control unit 16C is started.

At a timing t26, the installation of the third new version of software in the third electronic control unit 16C is completed. When the installation of the third new version of software in the third electronic control unit 16C is completed, the activation of the third new version of software installed in the third electronic control unit 16C is started.

At a timing t27, the activation of the third new version of software installed in the third electronic control unit 16C is completed. When the activation of the third new version of software installed in the third electronic control unit 16C is completed correctly, the update control section 30 performs the shutdown process on the third electronic control unit 16C. When the activation of the third new version of software installed in the third electronic control unit 16C is completed, the installation of the fourth new version of software in the fourth electronic control unit 16D is started.

At a timing t28, the installation of the fourth new version of software in the fourth electronic control unit 16D is completed. When the installation of the fourth new version of software in the fourth electronic control unit 16D is completed, the activation of the fourth new version of software installed in the fourth electronic control unit 16D is started.

At a timing t29, the activation of the fourth new version of software installed in the fourth electronic control unit 16D is completed. When the activation of the fourth new version of software installed in the fourth electronic control unit 16D is completed correctly, the update control section 30 performs the shutdown process on the fourth electronic control unit 16D.

At a timing t30, the ignition switch 18 is turned ON. From the timing t30, each of the plurality of electronic control units 16A to 16D executes the operational logic of the new version of software (NEW). From the timing t30, the electronic control units 16A to 16D, which operate based on the new versions of software, operate cooperatively (operate in synchronization).

According to the example shown in FIG. 7, the installation of the first new version of software in the first electronic control unit 16A is performed while the vehicle 10 is travelling. Therefore, according to the example shown in FIG. 7, it is possible to shorten the time during which the vehicle 10 cannot be used.

Figure 8:
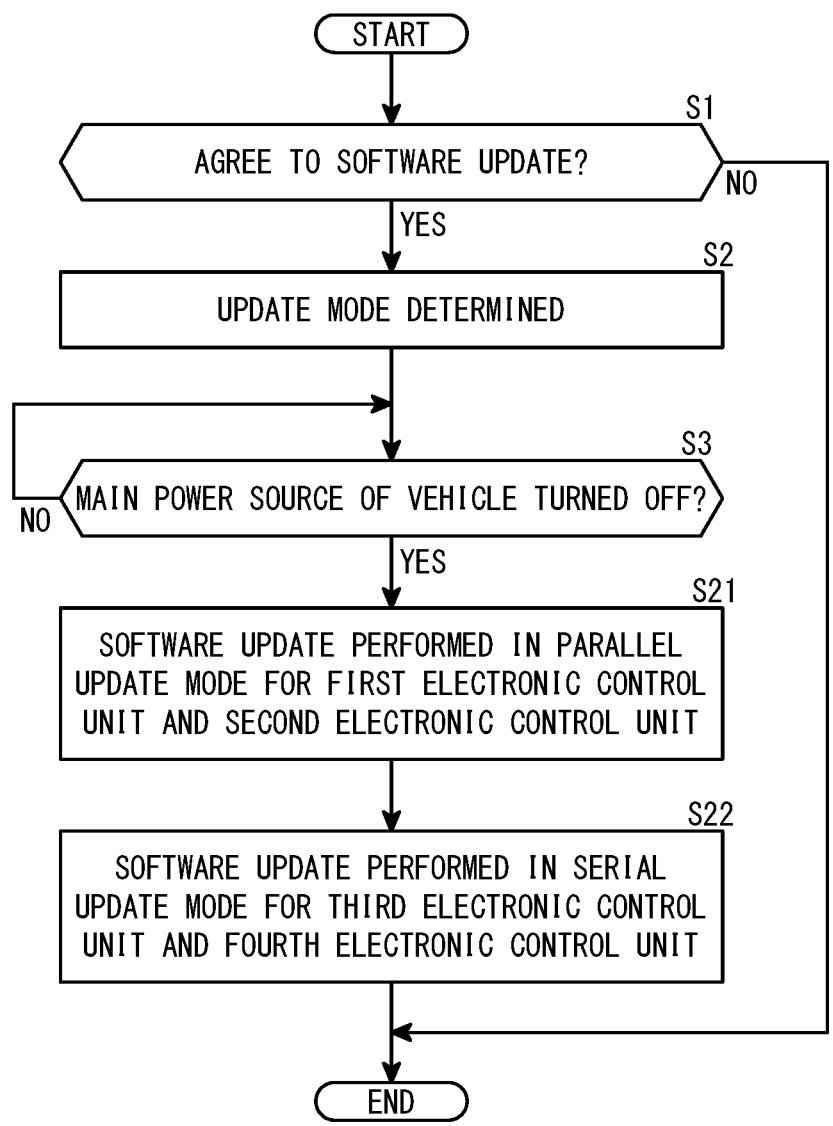
FIG. 8 is a flow chart showing an example of an operation of the software updating apparatus according to an embodiment.

FIG. 8 is a flow chart showing an example of an operation of the software updating apparatus according to the present embodiment. FIG. 8 shows an example of a case in which the software update in the parallel update mode and the software update in the serial update mode are performed in combination. In the example shown in FIG. 8, the software update for the first electronic control unit 16A and the second electronic control unit 16B is performed in the parallel update mode. Furthermore, in the example of FIG. 8, the software update for the third electronic control unit 16C and the fourth electronic control unit 16D is performed in the serial update mode.

Step S1 is the same as step S1 shown in FIG. 3, and therefore a description of this step is omitted.

At step S2, the update mode determining section 31 determines the update mode. The update mode determining section 31 makes a determination that the software update for the first electronic control unit 16A and the second electronic control unit 16B is to be performed in the parallel update mode, for example. Furthermore, the update mode determining section 31 makes a determination that the software update for the third electronic control unit 16C and the fourth electronic control unit 16D is to be performed in the serial update mode, for example. After this, the process moves to step S3.

At step S3, the update control section 30 judges whether the main power source of the vehicle 10 has been turned OFF. In other words, the update control section 30 judges whether the ignition switch 18 has been turned OFF. If the main power source of the vehicle 10 has been turned OFF (YES at step S3), the process moves to step S21. If the main power source of the vehicle 10 is ON (NO at step S3), step S3 is repeated.

At step S21, the update control section 30 performs the software update in the parallel update mode for the first electronic control unit 16A and the second electronic control unit 16B. After this, the process moves to step S22.

At step S22, the update control section 30 performs the software update in the serial update mode for the third electronic control unit 16C and the fourth electronic control unit 16D. When step S22 is completed, the process shown in FIG. 8 is completed.

Figure 9:
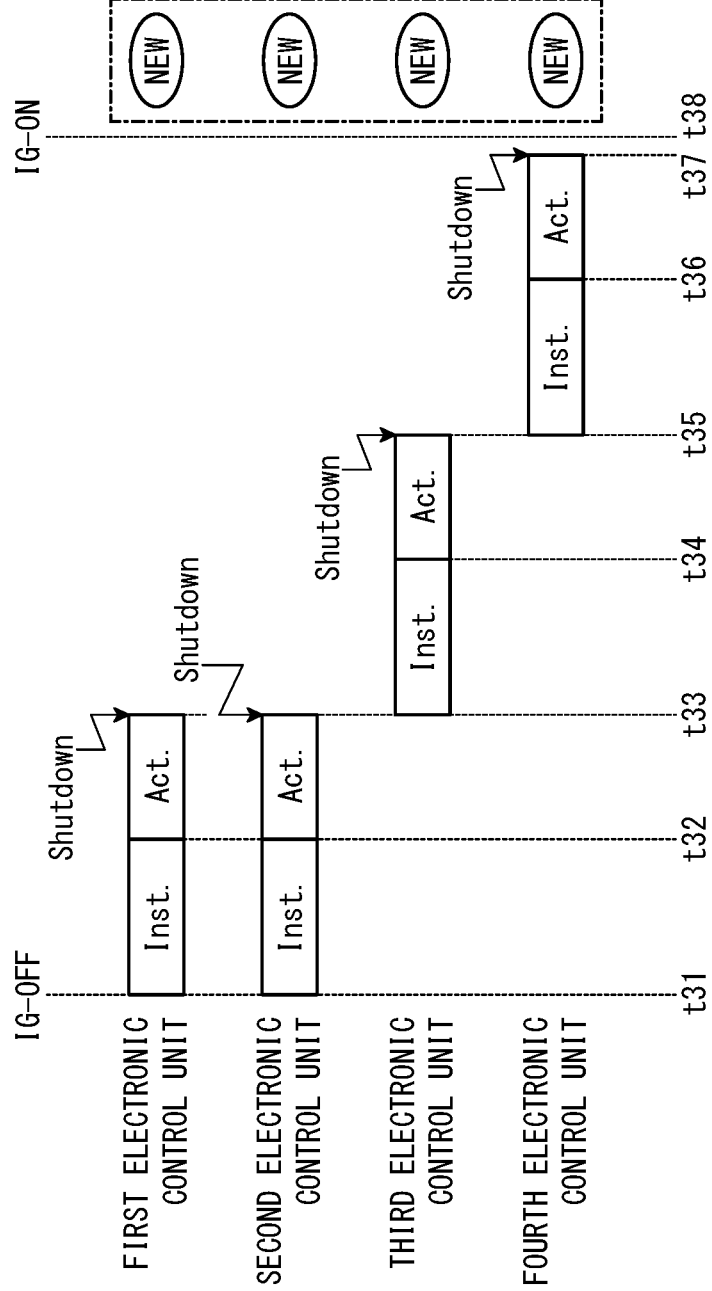
FIG. 9 is a timing chart showing an example of an operation of the software updating apparatus according to an embodiment.

FIG. 9 is a timing chart showing an example of an operation of the software updating apparatus according to the present embodiment. The timing chart shown in FIG. 9 corresponds to steps S21 and S22 in FIG. 8. In other words, FIG. 9 shows an example of a case in which the software update in the parallel update mode and the software update in the serial update mode are performed in combination.

As shown in FIG. 9, at a timing t31, the ignition switch 18 is turned OFF. At the timing t31, the installation of the new versions of software in the first electronic control unit 16A and the second electronic control unit 16B is started, for example.

At a timing t32, the installation of the new versions of software in the first electronic control unit 16A and the second electronic control unit 16B is completed. Here, in order to simplify the description, an example is described of a case in which the installations of the new versions of software in the electronic control units 16A and 16B are completed simultaneously, but the present invention is not limited to this. When the installation of the new versions of software in the first electronic control unit 16A and the second electronic control unit 16B is completed, the activation of the new version of software installed in each of the first electronic control unit 16A and the second electronic control unit 16B is started.

At a timing t33, the activation of the new version of software installed in each of the first electronic control unit 16A and the second electronic control unit 16B is completed. When the activation of the new version of software installed in each of the electronic control units 16A and 16B is completed correctly, the update control section 30 performs the shutdown process on each of the electronic control units 16A and 16B. When the activation of the new version of software installed in each of the first electronic control unit 16A and the second electronic control unit 16B is completed, the installation of the third new version of software in the third electronic control unit 16C is started.

At a timing t34, the installation of the third new version of software in the third electronic control unit 16C is completed. When the installation of the third new version of software in the third electronic control unit 16C is completed, the activation of the third new version of software installed in the third electronic control unit 16C is started.

At a timing t35, the activation of the third new version of software installed in the third electronic control unit 16C is completed. When the activation of the third new version of software installed in the third electronic control unit 16C is completed correctly, the update control section 30 performs the shutdown process on the third electronic control unit 16C. When the activation of the third new version of software installed in the third electronic control unit 16C is completed, the installation of the fourth new version of software in the fourth electronic control unit 16D is started.

At a timing t36, the installation of the fourth new version of software in the fourth electronic control unit 16D is completed. When the installation of the fourth new version of software in the fourth electronic control unit 16D is completed, the activation of the fourth new version of software installed in the fourth electronic control unit 16D is started.

At a timing t37, the activation of the fourth new version of software installed in the fourth electronic control unit 16D is completed. When the activation of the fourth new version of software installed in the fourth electronic control unit 16D is completed correctly, the update control section 30 performs the shutdown process on the fourth electronic control unit 16D.

At a timing t38, the ignition switch 18 is turned ON. From the timing t38, each of the plurality of electronic control units 16 executes the operational logic of the new version of software (NEW). From the timing t38, the electronic control units 16A to 16D, which operate based on the new versions of software, operate cooperatively (operate in synchronization).

In the examples shown in FIGS. 8 and 9, the software update is performed in the parallel update mode for the first electronic control unit 16A and the second electronic control unit 16B. Therefore, in the examples shown in FIGS. 8 and 9, it is possible to shorten the time needed for the software update, compared to the example shown in FIG. 5 in which the software update is performed in the serial update mode for all of the electronic control units 16A to 16D. In this way, the parallel update mode may be used as the update mode when performing the software update for the electronic control units 16A and 16B, which are a portion of the plurality of electronic control units 16. Then, the serial update mode may be used as the update mode when performing the software update for the electronic control units 16C and 16D, which are another portion of the plurality of electronic control units 16.

Figure 10:
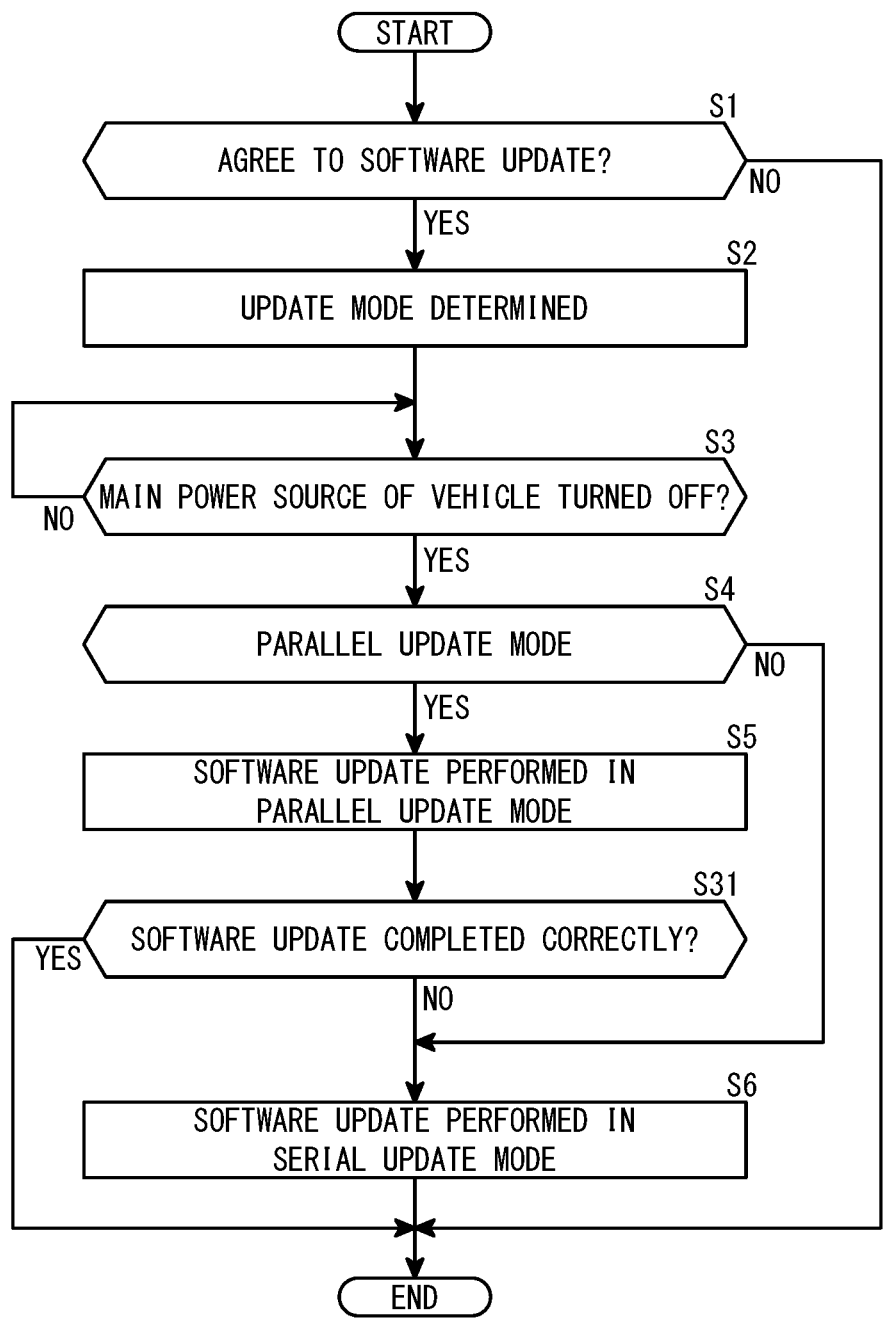
FIG. 10 is a flow chart showing an example of an operation of the software updating apparatus according to an embodiment.

FIG. 10 is a flow chart showing an example of an operation of the software updating apparatus according to the present embodiment. FIG. 10 shows an example of a case in which the software update is performed in the serial update mode when the software update in the parallel update mode is not completed correctly.

Steps S1 to S4 are the same as steps S1 to S4 described above using FIG. 3, and therefore descriptions of these steps are omitted.

At step S5, the update control section 30 performs the software update in the parallel update mode for each of the plurality of electronic control units 16. After this, the process moves to step S31.

At step S31, the update control section 30 judges whether the software update has been completed correctly for each of the plurality of electronic control units 16. If the software update has been completed correctly for each of the plurality of electronic control units 16 (YES at step S31), the process shown in FIG. 10 is completed. If the software update has not been completed correctly for each of the plurality of electronic control units 16 (NO at step S31), the process moves to step S6.

Step S6 is the same as step S6 described above using FIG. 3, and therefore a description of this step is omitted. When step S6 is completed, the process shown in FIG. 10 is completed.

Figure 11:
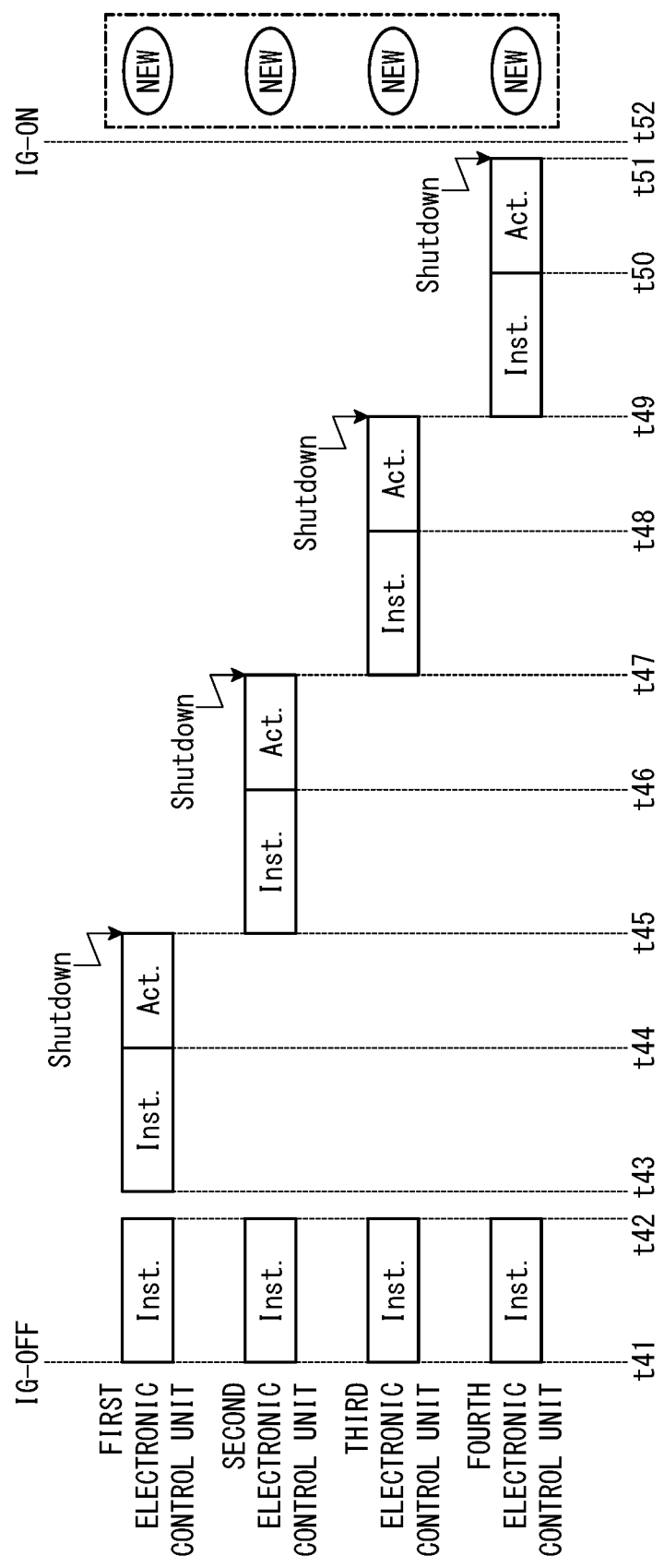
FIG. 11 is a timing chart showing an example of an operation of the software updating apparatus according to an embodiment.

FIG. 11 is a timing chart showing an example of an operation of the software updating apparatus according to the present embodiment, the timing chart shown in FIG. 11 corresponds to a case in which the software update in the parallel update mode is not completed correctly in the process shown in FIG. 10.

As shown in FIG. 11, at a timing t41, the ignition switch 18 is turned OFF. At the timing t41, the installation of the new versions of software in the plurality of electronic control units 16 is started in the parallel update mode.

At a timing t42, the installation of the new versions of software in the plurality of electronic control units 16 is completed. The update control section 30 judges whether the installation of the new version of software in each of the plurality of electronic control units 16 has been completed correctly. Here, an example is described of a case in which the installation of the new versions of software in the electronic control units 16 is not completed correctly. In such a case, the update mode determining section 31 makes a determination to change the update mode from the parallel update mode to the serial update mode.

At a timing t43, the installation of the first new version of software in the first electronic control unit 16A is started.

At a timing t44, the installation of the first new version of software in the first electronic control unit 16A is completed. When the installation of the first new version of software in the first electronic control unit 16A is completed, the activation of the first new version of software installed in the first electronic control unit 16A is started.

At a timing t45, the activation of the first new version of software installed in the first electronic control unit 16A is completed. When the activation of the first new version of software installed in the first electronic control unit 16A is completed correctly, the update control section 30 performs the shutdown process on the first electronic control unit 16A. When the activation of the first new version of software installed in the first electronic control unit 16A is completed, the installation of the second new version of software in the second electronic control unit 16B is started.

At a timing t46, the installation of the second new version of software in the second electronic control unit 16B is completed. When the installation of the second new version of software in the second electronic control unit 16B is not completed, the activation of the second new version of software installed in the second electronic control unit 16B is started.

At a timing t47, the activation of the second new version of software installed in the second electronic control unit 16B is completed. When the activation of the second new version of software installed in the second electronic control unit 16B is completed correctly, the update control section 30 performs the shutdown process on the second electronic control unit 16B. When the activation of the second new version of software installed in the second electronic control unit 16B is completed, the installation of the third new version of software in the third electronic control unit 16C is started.

At a timing t48, the installation of the third new version of software in the third electronic control unit 16C is completed. When the installation of the third new version of software in the third electronic control unit 16C is completed, the activation of the third new version of software installed in the third electronic control unit 16C is started.

At a timing t49, the activation of the third new version of software installed in the third electronic control unit 16C is completed. When the activation of the third new version of software installed in the third electronic control unit 16C is completed correctly, the update control section 30 performs the shutdown process on the third electronic control unit 16C. When the activation of the third new version of software installed in the third electronic control unit 16C is completed, the installation of the fourth new version of software in the fourth electronic control unit 16D is started.

At a timing t50, the installation of the fourth new version of software in the fourth electronic control unit 16D is completed. When the installation of the fourth new version of software in the fourth electronic control unit 16D is completed, the activation of the fourth new version of software installed in the fourth electronic control unit 16D is started.

At a timing t51, the activation of the fourth new version of software installed in the fourth electronic control unit 16D is completed. When the activation of the fourth new version of software installed in the fourth electronic control unit 16D is completed correctly, the update control section 30 performs the shutdown process on the fourth electronic control unit 16D.

At a timing t52, the ignition switch 18 is turned ON. From the timing t52, each of the plurality of electronic control units 16 executes the operational logic of the new version of software (NEW). From the timing t52, the electronic control units 16A to 16D, which operate based on the new versions of software, operate cooperatively (operate in synchronization).

In this way, if the software update is not completed correctly in the parallel update mode, the software update may be performed in the serial update mode.

Figure 12:
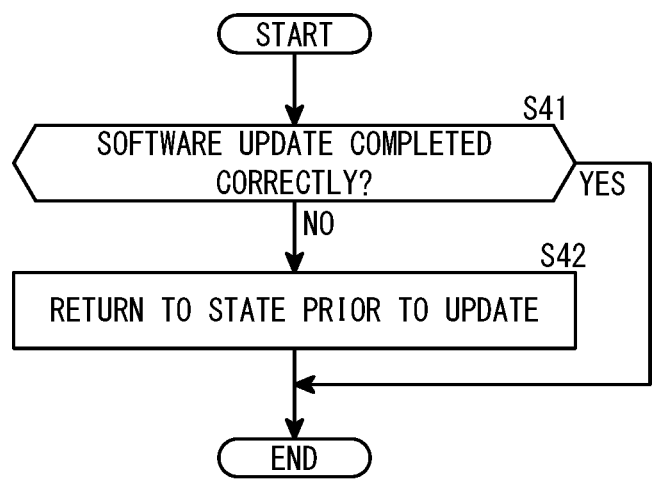
FIG. 12 is a flow chart showing an example of an operation of the software updating apparatus according to an embodiment.

FIG. 12 is a flow chart showing an example of an operation of the software updating apparatus according to the present embodiment. The process shown in FIG. 12 can be performed after the software update has been performed.

At step S41, the update control section 30 judges whether the software update has been completed correctly. If the software update has been completed correctly (YES at step S41), the process shown in FIG. 12 is completed. On the other hand, if the software update has not been completed correctly (NO at step S41), the process moves to step S42.

At step S42, the update control section 30 returns the software to the state prior to the update. For example, if the software update to the new version of software is not performed correctly for any one of the electronic control units 16B to 16D, the update control section 30 returns the software of the electronic control units 16B to 16D to the state prior to the update. In this way, the process of FIG. 12 is completed.

Figure 13:
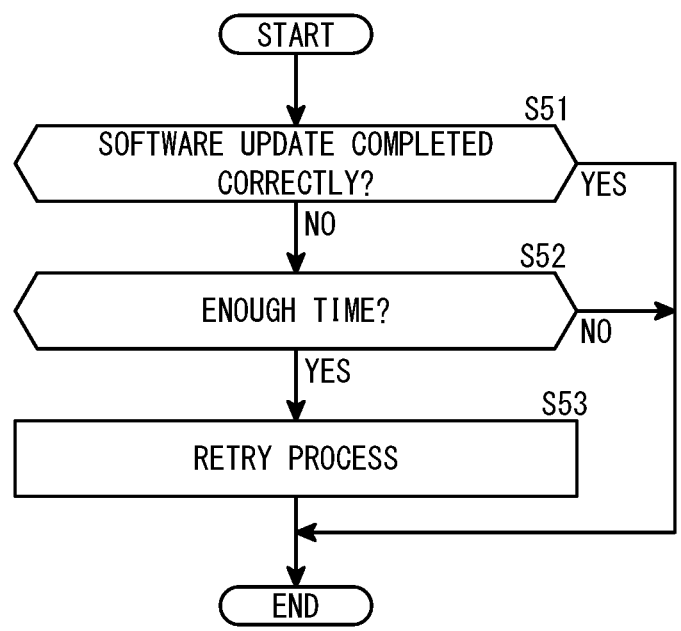
FIG. 13 is a flow chart showing an example of an operation of the software updating apparatus according to an embodiment.

FIG. 13 is a flow chart showing an example of an operation of the software updating apparatus according to the present embodiment. The process shown in FIG. 13 can be performed after the software update has been performed.

At step S51, the update control section 30 judges whether the software update has been completed correctly. If the software update has been completed correctly (YES at step S51), the process shown in FIG. 13 is completed. On the other hand, if the software update has not been completed correctly (NO at step S51), the process moves to step S52.

At step S52, the time margin judging section 32 judges whether there is enough time to perform a retry process for the installation of the new versions of software. If there is enough time to perform a retry process for the installation of the new versions of software (YES at step S52), the process moves to step S53. If there is not enough time to perform a retry process for the installation of the new versions of software (NO at step S52), the process shown in FIG. 13 is completed.

At step S53, the update control section 30 performs the retry process for the instillation of the new versions of software. In this way, the process shown in FIG. 13 is completed.

Figure 14:
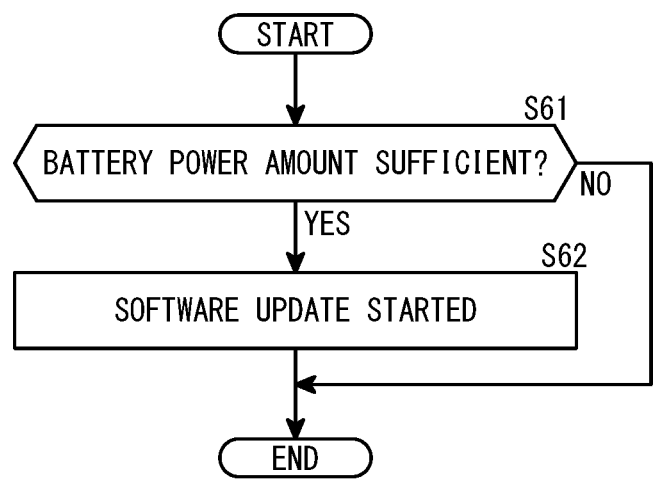
FIG. 14 is a flow chart showing an example of an operation of the software updating apparatus according to an embodiment.

FIG. 14 is a flow chart showing an example of an operation of the software updating apparatus according to the present embodiment. The process shown in FIG. 14 can be performed before the software update is started.

At step S61, the power amount judging section 34 judges whether there is enough power stored in the battery 20. More specifically, the power amount judging section 34 judges whether the amount of power stored in the battery 20 is enough to perform the software update. If the power amount judging section 34 judges that the amount of power stored in the battery 20 is enough to perform the software update (YES at step S61), the process moves to step S62. If the power amount judging section 34 judges that the amount of power stored in the battery 20 is not enough to perform the software update (NO at step S61), the process shown in FIG. 14 is completed.

At step S62, the update control section 30 starts the software update. In this way, the process shown in FIG. 14 is completed.

Figure 15:
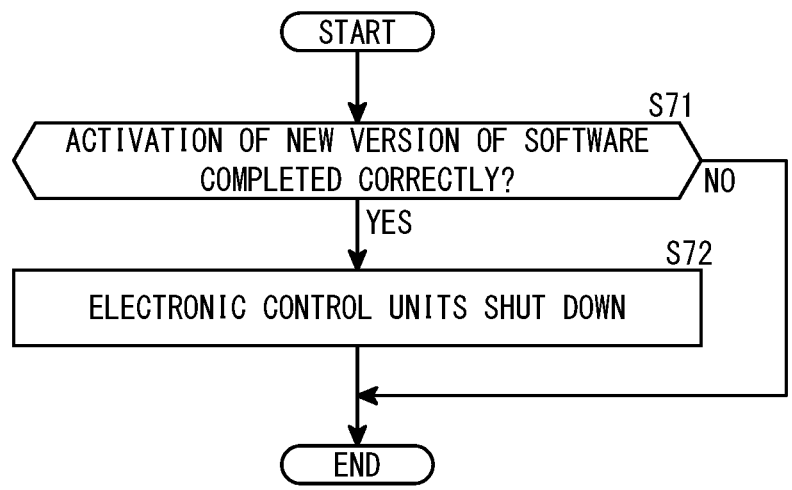
FIG. 15 is a flow chart showing an example of an operation of the software updating apparatus according to an embodiment.

FIG. 15 is a flow chart showing an example of an operation of the software updating apparatus according to the present embodiment. The process shown in FIG. 15 can be performed after the activation of the new versions of software in the electronic control units 16 has been completed.

At step S71, a judgment is made about whether the activation of the new versions of software in the electronic control units 16 has been completed correctly. If the activation of the new versions of software in the electronic control units 16 has been completed correctly (YES at step S71), the process moves to step S72. If the activation of the new versions of software in the electronic control units 16 has not been completed correctly (NO at step S71), the process shown in FIG. 15 is completed.

At step S72, the update control section 30 performs the shutdown process on the electronic control units 16 for which the activation of the new versions of software has been completed correctly. In this way, the process shown in FIG. 15 is completed.

Figure 16:
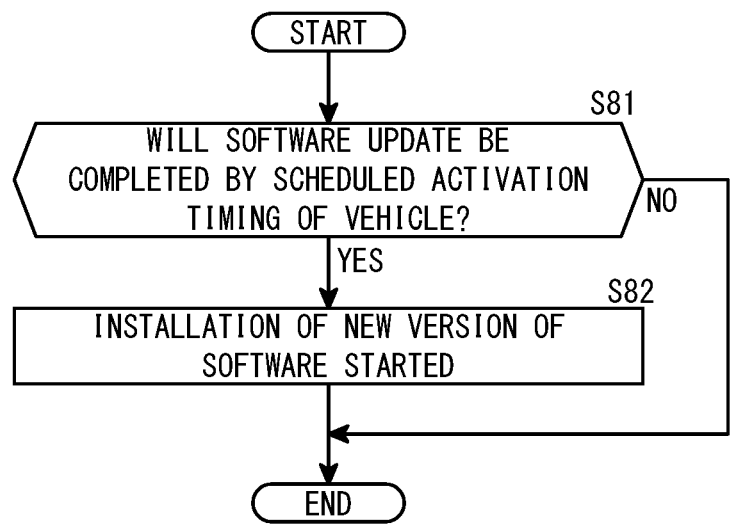
FIG. 16 is a flow chart showing an example of an operation of the software updating apparatus according to an embodiment.

FIG. 16 is a flow chart showing an example of an operation of the software updating apparatus according to the present embodiment, the process shown in FIG. 16 can be performed before the installation of the software in the electronic control units 16 is started.

At step S81, the update control section 30 judges whether the software update will be completed by the scheduled activation timing of the vehicle 10. If it is anticipated that the software update will be completed by the scheduled activation timing of the vehicle 10 (YES at step S81), the process moves to step S82. If it is anticipated that the software update will not be completed by the scheduled activation timing of the vehicle 10 (NO at step S81), the process shown in FIG. 16 is completed.

At step S82, the update control section 30 starts the installation of the new versions of software in the electronic control units 16. In this way, the process shown in FIG. 16 is completed.

In this way, in the present embodiment, it is possible to perform the software update in the parallel update mode, in which the software update is performed in parallel for the plurality of electronic control units 16. By performing the software update in the parallel update mode, it is possible to complete the software update in a relatively short time. Furthermore, in the present embodiment, it is possible to perform the software update in the serial update mode, in which the software update is performed in series for the plurality of electronic control units 16. Even when the software cannot be updated in the parallel update mode, there are cases where it is possible to update the software in the serial update mode. Therefore, according to the present embodiment, it is possible to more reliably update the software.

While the preferred embodiments of the present invention have been described above, the technical scope of the invention is not limited to the above described embodiments, and various alterations and improvements can be added to the above-described embodiments without deviating from the scope of the present invention.

The embodiment described above can be summarized as shown below.

A software updating apparatus (12) comprising an acquiring section (28) that acquires a new version of software supplied via a network (25); an update control section (30) that performs a software update for each of a plurality of electronic control units (16) mounted in a vehicle (10); and an update mode determining section (31) that selectively determines an update mode used when performing the software update for each of the plurality of electronic control units, from among a serial update mode in which the software update is performed in parallel for the plurality of electronic control units and a serial update mode in which the software update is performed in series for the plurality of electronic control units, wherein the update control section performs the software update for each of the plurality of electronic control units based on the update mode determined by the update mode determining section. According to this configuration, it is possible to perform the software update in the parallel update mode, in which the software update is performed in parallel for the plurality of electronic control units. By performing the software update in the parallel update mode, it is possible to complete the software update in a relatively short time. Furthermore, in the present embodiment, it is possible to perform the software update in the serial update mode, in which the software update is performed in series for the plurality of electronic control units. Even when the software cannot be updated in the parallel update mode, there are cases where it is possible to update the software in the serial update mode. Therefore, according to the present embodiment, it is possible to more reliably update the software.

A first electronic control unit (16A), among the plurality of electronic control units, may include a storage-capable region (50B) in which a first new version of software for updating a first old version of software installed in the first electronic control unit can be installed in a background, and in a case where installation of a second new version of software in a second electronic control unit (16B), among the plurality of electronic control units, or activation of the second new version of software installed in the second electronic control unit is not completed correctly, the update control section may perform a rollback process on the second electronic control unit and not activate the first new version of software installed in the first electronic control unit. According to this configuration, if the installation of the second new version of software in the second electronic control unit is not completed, the rollback process can be performed on the second electronic control unit. In such a case, the first version of new software installed in the first electronic control unit is not activated. Therefore, according to the present embodiment, it is possible to prevent the first electronic control unit and the second electronic control unit from being unable to operate cooperatively.

The update control section may be provided in the vehicle.

If the new version of software cannot be acquired through wireless communication, the acquiring section may acquire the new version of software through wired communication using a cable (44) connected to a charger (42). According to this configuration, if the new version of software cannot be acquired through wireless communication, the new version of software can be acquired through wired communication using the cable connected to the charger. Therefore, according to this configuration, it is possible to more reliably update the software.

If the vehicle is connected to a charger provided in a home, the update mode determining section may determine the update mode used when performing the software update on the plurality of electronic control units to be the serial update mode. If the vehicle is located at a home, it is usually the case that there is sufficient time. Furthermore, if the vehicle is connected to a charger, the battery is not consumed even when a long time is needed for the software update. Therefore, according to this configuration, it is possible to more reliably update the software without causing certain problems.

The first electronic control unit, among the plurality of electronic control units, may include the storage-capable region in which the first new version of software for updating the first old version of software installed in the first electronic control unit can be installed in the background, and the update control section may perform the installation of the first new version of software in the first electronic control unit while the vehicle is travelling. According to this configuration, since the installation of the first new version of software in the first electronic control unit to be performed while the vehicle is travelling, it is possible to shorten the time needed to update the software.

The update mode determining section may determine the update mode used when performing the software update for some of the electronic control units among the plurality of electronic control units to be the parallel update mode, and determine the update mode used when performing the software update for other electronic control units among the plurality of electronic control units to be the serial update mode. For example, it is possible to perform the software update in the parallel update mode for electronic control units for which there is a high possibility of the software update being completed correctly without causing any particular problems caused by the parallel update mode. On the other hand, for example, it is possible to perform the software update in the serial update mode for electronic control units for which there is a sufficiently low possibility of the software update being completed correctly without causing any particular problems caused by the parallel update mode. According to this configuration, it is possible to reliably update the software while shortening the time needed to update the software.

If the software update is not completed correctly in the parallel update mode, the update control section may perform the software update in the serial update mode. With this configuration, even if the software update is not completed correctly in the parallel update mode, it is possible to reliably perform the software update in the serial update mode.

The software updating apparatus may further comprise a scheduled activation timing judging section (36) that judges a scheduled activation timing that is a timing at which the vehicle is scheduled to be activated, wherein the update mode determining section may perform time distribution between time spent performing the software update in the parallel update mode and time spent performing the software update in the serial update mode, in order to complete the software update for the plurality of electronic control units by the scheduled activation timing judged by the scheduled activation timing judging section. According to this configuration, since time distribution is performed between time spent performing the software update in the parallel update mode and time spent performing the software update in the serial update mode, it is possible to complete the software update by the scheduled activation timing.

The software updating apparatus may further comprise a time margin judging section (32) that judges whether there is enough time, and if the installation of the new versions of software in the electronic control units is not completed correctly and also the time margin judging section judges that there is enough time, the update control section may perform a retry process for the installation of the new versions of software in the electronic control units. According to this configuration, even if the installation of the new versions of software in the electronic control units cannot be performed correctly, it is possible to install the new versions of software in the electronic control units by performing the retry process.

The first electronic control unit, among the plurality of electronic control units, may include the storage-capable region in which the first new version of software for updating the first old version of software installed in the first electronic control unit can be installed in the background, and the update control section may perform the software update for the first electronic control unit such that, after the software update has been performed, the first electronic control unit can selectively execute operational logic of the first new version of software and operational logic of the first old version of software. According to this configuration, if the first electronic control unit in which the first new version of software is installed and an electronic control unit other than the first electronic control unit cannot favorably operate cooperatively, it is possible to perform the operation described below. Specifically, in such a case, the update control section returns the software of the electronic control unit other than the first electronic control unit to a state prior to the update, and causes the first electronic control unit to execute the operational logic of the first old version of software. By doing this, according to this configuration, the first electronic control unit and the electronic control unit other than the first electronic control unit can be made to operate cooperatively, despite the first new version of software being installed in the first electronic control unit. In this way, according to this configuration, it is possible to more favorably perform the software update.

The software updating apparatus may further comprise a scheduled activation timing judging section that judges a scheduled activation timing that is a timing at which the vehicle is scheduled to be activated, wherein the update control section may start the software update for the plurality of electronic control units if it is anticipated that the software update for the plurality of electronic control units will be completed by the scheduled activation timing judged by the scheduled activation timing judging section. According to this configuration, if the software update cannot be completed by the scheduled activation timing of the vehicle, the software update for the electronic control units is not started. Therefore, it is possible to prevent the occurrence of situations in which the user cannot use the vehicle.

The first electronic control unit may be an electronic control unit that has a display control function. The electronic control unit having the display control function includes a high-capacity memory chip.

The first electronic control unit may be an electronic control unit for in-vehicle infotainment. The electronic control unit for in-vehicle infotainment includes a high-capacity memory chip.

The software updating apparatus may further comprise a power amount judging section (34) that judges whether there is enough power stored in a battery (20) provided in the vehicle, and if the power amount judging section judges that there is enough power stored in the battery, the update control section may start the software update. According to this configuration, if there is not enough power in the battery, the software update is not performed, and therefore it is possible to prevent malfunctions.

A software updating apparatus comprises an acquiring section that acquires a new version of software supplied via a network; an update control section that performs a software update for each of a plurality of electronic control units mounted in a vehicle, by using the new version of software acquired by the acquiring section; an update mode determining section that selectively determines an update mode used when performing the software update for each of the plurality of electronic control units, from among a serial update mode in which the software update is performed in parallel for the plurality of electronic control units and a serial update mode in which the software update is performed in series for the plurality of electronic control units; and a scheduled activation timing judging section that judges a scheduled activation timing that is a timing at which the vehicle is scheduled to be activated, wherein the update control section determines the update mode of software for the plurality of electronic control units to be the serial update mode if a completion timing of the software update in a case where the software update is performed in the serial update mode for the plurality of electronic control units is before the scheduled activation timing judged by the scheduled activation timing judging section, and determines the update mode of software for the plurality of electronic control units to be the parallel update mode if the completion timing of the software update in the case where the software update is performed in the serial update mode for the plurality of electronic control units is after the scheduled activation timing judged by the scheduled activation timing judging section, and the update control section performs the software update for each of the plurality of electronic control units based on the update mode determined by the update mode determining section. According to this configuration, the update mode is suitably selected according to the scheduled activation timing, and therefore it is possible to favorably perform the software update for the electronic control units.

A vehicle (10) comprises the software updating apparatus described above.

A software update method for performing a software update for each of a plurality of electronic control units mounted in a vehicle, by using a new version of software supplied via a network, the software update method comprising a step (S2) of selectively determining an update mode used when performing the software update for the plurality of electronic control units, from among a serial update mode in which the software update is performed in parallel for the plurality of electronic control units and a serial update mode in which the software update is performed in series for the plurality of electronic control units; and a step (S5, S6) of performing the software update for the plurality electronic control units in the update mode determined in the step of determining the update mode.

What is claimed is:

1. A software updating apparatus comprising one or more processors that execute computer-executable instructions stored in a memory, wherein the one or more processors execute the computer-executable instructions to cause the software updating apparatus to:
    acquire a new version of software supplied via a network;
    perform a software update for each of a plurality of electronic control units mounted in a vehicle, by using the new version of software;
    selectively determine an update mode used when performing the software update for each of the plurality of electronic control units, from among a parallel update mode in which the software update is performed in parallel for the plurality of electronic control units and a serial update mode in which the software update is performed in series for the plurality of electronic control units;
    perform the software update for each of the plurality of electronic control units based on the selectively determined update mode;
    judge a scheduled activation timing that is a timing at which the vehicle is scheduled to be activated; and
    perform time distribution between time spent performing the software update in the parallel update mode and time spent performing the software update in the serial update mode, in order to complete the software update for the plurality of electronic control units by the scheduled activation timing.

2. The software updating apparatus according to claim 1, wherein
    a first electronic control unit, among the plurality of electronic control units, includes a storage-capable region in which a first new version of software for updating a first old version of software installed in the first electronic control unit is allowed to be installed in a background, and
    in a case where installation of a second new version of software in a second electronic control unit, among the plurality of electronic control units, or activation of the second new version of software installed in the second electronic control unit is not completed correctly, the one or more processors cause the software updating apparatus to perform a rollback process on the second electronic control unit and not activate the first new version of software installed in the first electronic control unit.

3. The software updating apparatus according to claim 2, wherein
    the first electronic control unit is an electronic control unit that has a display control function.

4. The software updating apparatus according to claim 3, wherein
    the first electronic control unit is an electronic control unit for in-vehicle infotainment.

5. The software updating apparatus according to claim 1, wherein
    the one or more processors are provided in the vehicle.

6. The software updating apparatus according to claim 1, wherein
    if the new version of software is not allowed to be acquired through wireless communication, the one or more processors cause the software updating apparatus to acquire the new version of software through wired communication using a cable connected to a charger.

7. The software updating apparatus according to claim 1, wherein
    if the vehicle is connected to a charger provided in a home, the one or more processors cause the software updating apparatus to determine the update mode used when performing the software update on the plurality of electronic control units to be the serial update mode.

8. The software updating apparatus according to claim 1, wherein a first electronic control unit, among the plurality of electronic control units, includes a storage-capable region in which a first new version of software for updating a first old version of software installed in the first electronic control unit is allowed to be installed in a background, and the one or more processors cause the software updating apparatus to perform installation of the first new version of software in the first electronic control unit while the vehicle is travelling.

9. The software updating apparatus according to claim 8, wherein
the first electronic control unit is an electronic control unit that has a display control function.

10. The software updating apparatus according to claim 1, wherein
the one or more processors cause the software updating apparatus to determine the update mode used when performing the software update for some of the electronic control units among the plurality of electronic control units to be the parallel update mode, and determines the update mode used when performing the software update for other electronic control units among the plurality of electronic control units to be the serial update mode.

11. The software updating apparatus according to claim 1, wherein
if the software update is not completed correctly in the parallel update mode, the one or more processors cause the software updating apparatus to perform the software update in the serial update mode.

12. The software updating apparatus according to claim 1, wherein the one or more processors cause the software updating apparatus to judge whether there is enough time, wherein
if installation of the new versions of software in the electronic control units is not completed correctly and also the software updating apparatus judges that there is enough time, the one or more processors cause the software updating apparatus to perform a retry process for the installation of the new versions of software in the electronic control units.

13. The software updating apparatus according to claim 1, wherein
a first electronic control unit, among the plurality of electronic control units, includes a storage-capable region in which a first new version of software for updating a first old version of software installed in the first electronic control unit is allowed to be installed in a background, and the one or more processors cause the software updating apparatus to perform the software update for the first electronic control unit such that, after the software update has been performed, the first electronic control unit can selectively execute operational logic of the first new version of software and operational logic of the first old version of software.

14. The software updating apparatus according to claim 13, wherein
the first electronic control unit is an electronic control unit that has a display control function.

15. The software updating apparatus according to claim 1, wherein the one or more processors cause the software updating apparatus to judge a scheduled activation timing that is a timing at which the vehicle is scheduled to be activated, wherein the one or more processors cause the software updating apparatus to start the software update for the plurality of electronic control units if it is anticipated that the software update for the plurality of electronic control units will be completed by the scheduled activation timing judged.

16. The software updating apparatus according to claim 1, wherein the one or more processors cause the software updating apparatus to judge whether there is enough power stored in a battery provided in the vehicle, wherein
if the software updating apparatus judges that there is enough power stored in the battery, the one or more processors cause the software updating apparatus to start the software update.

17. A software updating apparatus comprising one or more processors that execute computer-executable instructions stored in a memory, wherein the one or more processors execute the computer-executable instructions to cause the software updating apparatus to:
acquire a new version of software supplied via a network;
perform a software update for each of a plurality of electronic control units mounted in a vehicle, by using the new version of software acquired by the acquiring section;
selectively determine an update mode used when performing the software update for each of the plurality of electronic control units, from among a parallel update mode in which the software update is performed in parallel for the plurality of electronic control units and a serial update mode in which the software update is performed in series for the plurality of electronic control units;
judge a scheduled activation timing that is a timing at which the vehicle is scheduled to be activated, wherein
the one or more processors cause the software updating apparatus to determine the update mode of software for the plurality of electronic control units to be the serial update mode if a completion timing of the software update in a case where the software update is performed in the serial update mode for the plurality of electronic control units is before the scheduled activation timing judged, and determines the update mode of software for the plurality of electronic control units to be the parallel update mode if the completion timing of the software update in the case where the software update is performed in the serial update mode for the plurality of electronic control units is after the scheduled activation timing judged; and
performs the software update for each of the plurality of electronic control units based on the update mode determined.

18. A software update method for performing a software update for each of a plurality of electronic control units mounted in a vehicle, by using a new version of software supplied via a network, the software update method comprising:
a step of selectively determining an update mode used when performing the software update for the plurality of electronic control units, from among a parallel update mode in which the software update is performed in parallel for the plurality of electronic control units and a serial update mode in which the software update is performed in series for the plurality of electronic control units;
a step of performing the software update for the plurality electronic control units in the update mode determined in the step of determining the update mode;

a step of judging a scheduled activation timing that is a timing at which the vehicle is scheduled to be activated; and a step of performing time distribution between time spent performing the software update in the parallel update mode and time spent performing the software update in the serial update mode, in order to complete the software update for the plurality of electronic control units by the scheduled activation timing.

19. A software updating method for performing a software update for each of a plurality of electronic control units mounted in a vehicle, by using a new version of software supplied via a network, the software updating method comprising:

a step of selectively determining an update mode used when performing the software update for each of the plurality of electronic control units, from among a parallel update mode in which the software update is performed in parallel for the plurality of electronic control units and a serial update mode in which the software update is performed in series for the plurality of electronic control units;

a step of performing the software update for each of the plurality of electronic control units in the update mode determined in the step of selectively determining the update mode;

a step of judging a scheduled activation timing that is a timing at which the vehicle is scheduled to be activated; and in the step of selectively determining the update mode, determining the update mode of software for the plurality of electronic control units to be the serial update mode if a completion timing of the software update in a case where the software update is performed in the serial update mode for the plurality of electronic control units is before the scheduled activation timing judged, and determines the update mode of software for the plurality of electronic control units to be the parallel update mode if the completion timing of the software update in the case where the software update is performed in the serial update mode for the plurality of electronic control units is after the scheduled activation timing judged.

* * * * *